United States Patent
Masuda et al.

(10) Patent No.: US 11,731,730 B2
(45) Date of Patent: Aug. 22, 2023

(54) CONTROL DEVICE, OPERATING DEVICE, AND CONTROL SYSTEM FOR HUMAN-POWERED VEHICLE

(71) Applicant: SHIMANO INC., Sakai (JP)

(72) Inventors: Takaya Masuda, Sakai (JP); Fumihide Numata, Sakai (JP); Takashi Matsubara, Sakai (JP); Tomohiro Takimoto, Sakai (JP)

(73) Assignee: SHIMANO INC., Sakai (JP)

( * ) Notice: Subject to any disclaimer, the term of this patent is extended or adjusted under 35 U.S.C. 154(b) by 645 days.

(21) Appl. No.: 16/864,170

(22) Filed: May 1, 2020

(65) Prior Publication Data
US 2021/0339824 A1 Nov. 4, 2021

(51) Int. Cl.
| | |
|---|---|
| *B62M 6/45* | (2010.01) |
| *B62M 6/90* | (2010.01) |
| B62M 25/08 | (2006.01) |
| B62J 43/30 | (2020.01) |
| B62J 45/00 | (2020.01) |

(52) U.S. Cl.
CPC ................ *B62M 6/45* (2013.01); *B62M 6/90* (2013.01); *B62J 43/30* (2020.02); *B62J 45/00* (2020.02); *B62M 25/08* (2013.01)

(58) Field of Classification Search
CPC . B62M 6/45; B62M 6/90; B62M 25/08; B62J 43/30; B62J 45/00; B62J 45/41; B62K 23/02
See application file for complete search history.

(56) References Cited

U.S. PATENT DOCUMENTS

| | | | |
|---|---|---|---|
| 2006/0232816 A1* | 10/2006 | Konno | H04N 1/00344 358/1.15 |
| 2012/0035011 A1* | 2/2012 | Menachem | B62M 9/122 474/122 |
| 2014/0102237 A1* | 4/2014 | Jordan | H04W 74/08 74/473.12 |
| 2019/0031283 A1 | 1/2019 | Suzuki et al. | |

FOREIGN PATENT DOCUMENTS

| | | |
|---|---|---|
| CN | 109319028 | 2/2019 |
| TW | 201943602 | 11/2019 |

* cited by examiner

*Primary Examiner* — Kevin Hurley
*Assistant Examiner* — Marlon A Arce
(74) *Attorney, Agent, or Firm* — Mori & Ward, LLP

(57) ABSTRACT

A control device for a first communicator of a human-powered vehicle configured to establish one of a wireless communication and a wired communication with a second communicator comprises a power supply controller. The power supply controller is configured to control a power supplying state of at least one of a first electric power source and a second electric power source to supply electric power to the first communicator based on at least one of a power-source state of at least one of the first electric power source and the second electric power source and a communication state between the first communicator and the second communicator.

22 Claims, 15 Drawing Sheets

CONTROL DEVICE, OPERATING DEVICE, AND CONTROL SYSTEM FOR HUMAN-POWERED VEHICLE

BACKGROUND OF THE INVENTION

Field of the Invention

The present invention relates to an control device, an operating device, and a control system for a human-powered vehicle.

Discussion of the Background

A human-powered vehicle includes an electric device configured to communicate with other electric components.

SUMMARY OF THE INVENTION

In accordance with a first aspect of the present invention, a control device for a first communicator of a human-powered vehicle configured to establish one of a wireless communication and a wired communication with a second communicator comprises a power supply controller. The power supply controller is configured to control a power supplying state of at least one of a first electric power source and a second electric power source to supply electric power to the first communicator based on at least one of a power-source state of at least one of the first electric power source and the second electric power source and a communication state between the first communicator and the second communicator.

With the control device according to the first aspect, it is possible to select the preferable setting of the power supplying state based on the power-source state and/or the communication state.

In accordance with a second aspect of the present invention, the control device according to the first aspect further comprises a detector configured to detect the at least one of the power-source state and the communication state.

With the control device according to the second aspect, it is possible to reliably obtain the at least one of the power-source state and the communication state using the detector.

In accordance with a third aspect of the present invention, the control device according to the second aspect is configured so that the detector is configured to detect the power-source state. The power supply controller is configured to control the power supplying state in accordance with the power-source state detected by the detector.

With the control device according to the third aspect, it is possible to select the preferable setting of the power supplying state using the power-source state.

In accordance with a fourth aspect of the present invention, the control device according to the third aspect is configured so that the power-source state includes a first connection state where the second electric power source is connected to a connection port. The power supply controller is configured to control electric power supplied from the first electric power source to the first communicator to have a first amount in accordance with the first connection state detected by the detector. The power supply controller is configured to control electric power supplied from the second electric power source to the first communicator to have a second amount in accordance with the first connection state detected by the detector. The second amount is larger than the first amount.

With the control device according to the fourth aspect, it is possible to preferentially use the second electric power source if the second electric power source is connected to the connection port.

In accordance with a fifth aspect of the present invention, the control device according to the fourth aspect is configured so that the first amount is zero.

With the control device according to the fifth aspect, it is possible to reduce consumption of the stored electric power of the first electric power source.

In accordance with a sixth aspect of the present invention, the control device according to the third aspect is configured so that the power-source state includes a second connection state where the second electric power source is not connected to the connection port. The power supply controller is configured to control electric power supplied from the first electric power source to the first communicator to have a first amount in accordance with the second connection state detected by the detector. The first amount is larger than zero.

With the control device according to the sixth aspect, it is possible to use the first electric power source if the second electric power source is not connected to the connection port.

In accordance with a seventh aspect of the present invention, the control device according to any one of the three to sixth aspects is configured so that the power-source state includes an electrical-loading state of the first electric power source. The power supply controller is configured to control the power supplying state based on comparison between the electrical-loading state detected by the detector and a predetermined electrical-loading state.

With the control device according to the seventh aspect, it is possible to select the preferable setting of the power supplying state based on the electrical-loading state of the first electric power source.

In accordance with an eighth aspect of the present invention, the control device according to the seventh aspect is configured so that the electrical-loading state relates to at least one of a voltage, a current, resistance, a temperature, a power threshold, and a priority level of the first electric power source.

With the control device according to the eighth aspect, it is possible to select the preferable setting of the power supplying state based on several factors of the electrical-loading state of the first electric power source.

In accordance with a ninth aspect of the present invention, the control device according to any one of the second to eighth aspects is configured so that the detector is configured to detect the communication state. The power supply controller is configured to control the electric power supplying state in accordance with the communication state detected by the detector.

With the control device according to the ninth aspect, it is possible to select the preferable setting of the power supplying state using the communication state.

In accordance with a tenth aspect of the present invention, the control device according to the ninth aspect is configured so that the communication state includes a first communication state where the first communicator establishes a wired communication with the second communicator. The power supply controller is configured to control electric power supplied from the first electric power source to the first communicator to have a first amount in accordance to the first communication state detected by the detector. The power supply controller is configured to control electric power supplied from the second electric power source to the first communicator to have a second amount in accordance with the first communication state detected by the detector. The second amount is larger than the first amount.

With the control device according to the tenth aspect, it is possible to preferentially use the second electric power source if the first communicator establishes the wired communication with the second communicator.

In accordance with an eleventh aspect of the present invention, the control device according to the tenth aspect is configured so that the first amount is zero.

With the control device according to the eleventh aspect, it is possible to reduce consumption of the stored electric power of the first electric power source.

In accordance with a twelfth aspect of the present invention, the control device according to the ninth aspect is configured so that the communication state includes a second communication state where the first communicator establishes a wireless communication with the second communicator. The power supply controller is configured to control electric power supplied from the first electric power source to the first communicator to have a first amount in accordance with the second communication state detected by the detector. The power supply controller is configured to control electric power supplied from the second electric power source to the first communicator to have a second amount in accordance with the second communication state detected by the detector. The first amount is larger than the second amount.

With the control device according to the twelfth aspect, it is possible to use the first electric power source if the first communicator establishes the wireless communication with the second communicator.

In accordance with a thirteenth aspect of the present invention, the control device according to the twelfth aspect is configured so that the second amount is zero.

With the control device according to the thirteenth aspect, it is possible to reduce consumption of the stored electric power of the second electric power source.

In accordance with a fourteenth aspect of the present invention, the control device according to any one of the first to thirteenth aspects further comprises an informing unit configured to inform the at least one of the power-source state and the communication state.

With the control device according to the fourteenth aspect, it is possible to inform the user of the at least one of the power-source state and the communication state.

In accordance with a fifteenth aspects of the present invention, the control device according to any one of the first to fourteenth aspects is configured so that the power supply controller includes a first voltage controller and a second voltage controller. The first voltage controller is configured to convert a first input voltage supplied from the first electric power source. The second voltage controller is configured to convert a second input voltage supplied from the second electric power source.

With the control device according to the fifteenth aspect, it is possible to convert the first input voltage and the second input voltage to output voltages suitable for the first communicator.

In accordance with a sixteenth aspect of the present invention, the control device according to the fifteenth aspect is configured so that the first voltage controller is configured to increase the first input voltage to a first predetermined voltage. The second voltage controller is configured to regulate the second input voltage to a second predetermined voltage.

With the control device according to the sixteenth aspect, it is possible to use the first electric power source having an output voltage lower than an input voltage of the first communicator and to use the second electric power source having an output voltage higher than the input voltage of the first communicator.

In accordance with a seventeenth aspect of the present invention, an operating device for a human-powered vehicle comprises the control device according to any one of the first to sixteenth aspects, a base member, and a movable member pivotally coupled to the base member about a pivot axis.

With the operating device according to the seventeenth aspect, it is possible to utilize the control device for the operating device.

In accordance with an eighteenth aspect of the present invention, the operating device according to the seventeenth aspect is configured so that the base member extends in a longitudinal direction and includes a first end portion, a second end portion, and a grip portion. The first end portion is configured to be coupled to a handlebar. The second end portion is opposite to the first end portion in the longitudinal direction. The grip portion is provided between the first end portion and the second end portion.

With the operating device according to the eighteenth aspect, it is possible to utilize the control device for the operating device having the grip portion.

In accordance with a nineteenth aspect of the present invention, a control system for a human-powered vehicle comprises the control device according to at least one of the first to sixteenth aspects and the second communicator.

With the control system according to the nineteenth aspect, it is possible to provide the control device for the control system including the second communicator.

In accordance with a twentieth aspect of the present invention, the control system according to the nineteenth aspect is configured so that the second communicator is coupled to at least one component of the human-powered vehicle. The at least one component includes one of a gear changing device, a suspension, an adjustable seatpost assembly, a brake device, a display device, and a drive assist unit.

With the control system according to the twentieth aspect, it is possible to utilize the control system for the at least one component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
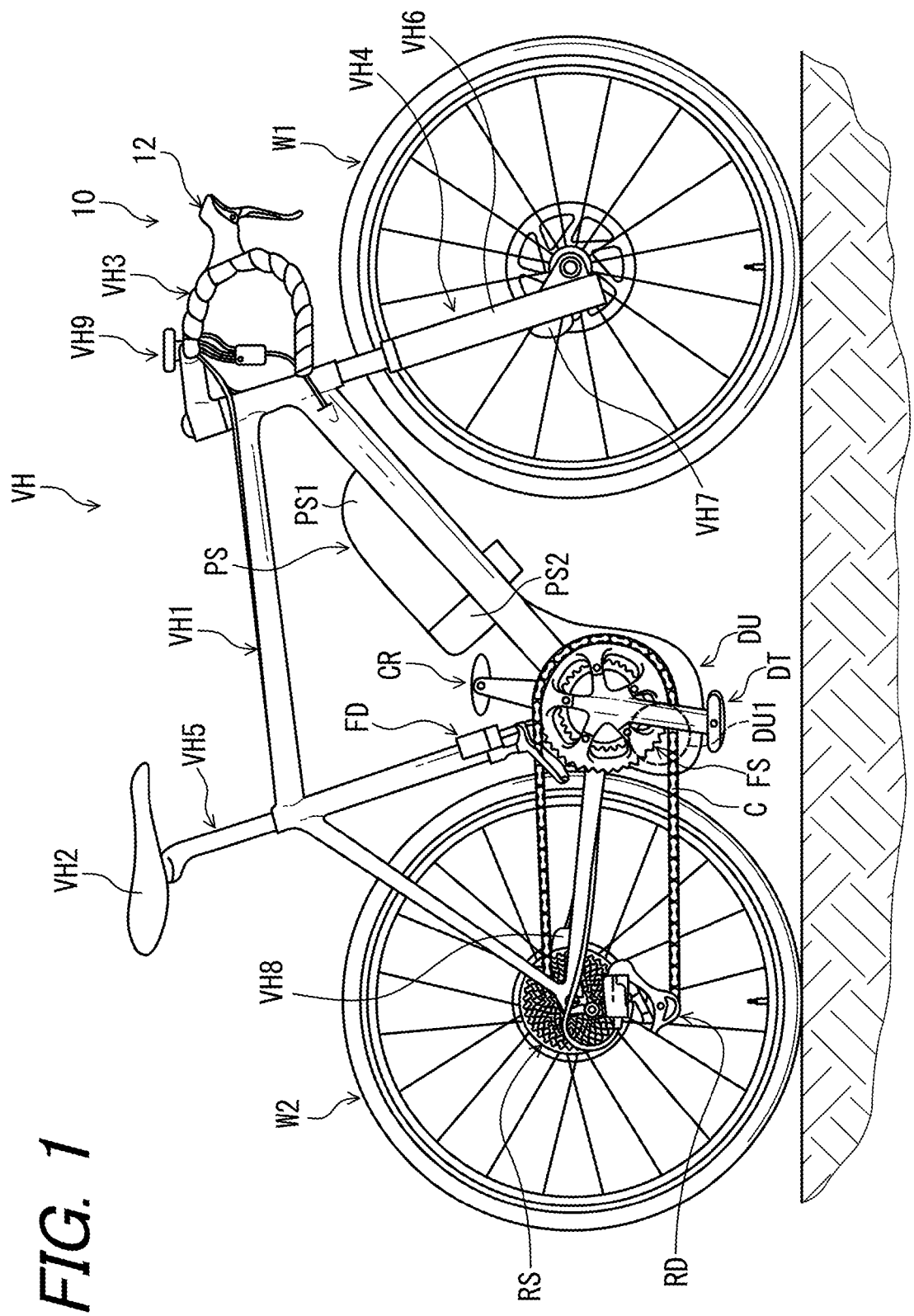
FIG. 1 is a side elevational view of a human-powered vehicle including a control system in accordance with an embodiment.

The embodiment(s) will now be described with reference to the accompanying drawings, wherein like reference numerals designate corresponding or identical elements throughout the various drawings.

Referring initially to FIG. 1, a human-powered vehicle VH includes a control system 10 in accordance with an embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In the present embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In the present embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the control system 10 can be applied to mountain bikes or any type of human-powered vehicles.

The human-powered vehicle VH further includes a vehicle body VH1, a saddle VH2, a handlebar VH3, a front fork VH4, an adjustable seatpost assembly VH5, a suspension VH6, brake device VH7, a brake device VH8, and a display device VH9. The front fork VH4 is rotatably mounted to the vehicle body VH1. The handlebar VH3 is secured to the front fork VH4. The saddle VH2 is attached to the adjustable seatpost assembly VH5. The adjustable seatpost assembly VH5 is mounted to the vehicle body VH1 to change a position of the saddle VH2 relative to the vehicle body VH1. The suspension VH6 is mounted to the front fork VH4 to absorb shock transmitted from a road. The display device VH9 is configured to display information relating to the human-powered vehicle VH. Examples of the display device VH9 includes a cycle computer, a smartphone, and a tablet computer.

The human-powered vehicle VH further includes a front wheel W1 and a rear wheel W2. The front wheel W1 is rotatably coupled to the front fork VH4. The rear wheel W2 is rotatably coupled to the vehicle body VH1. The brake device VH7 is configured to apply braking force to the front wheel W1. The brake device VH8 is configured to apply braking force to the rear wheel W2.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the control system 10 or other components, should be interpreted relative to the human-powered vehicle VH equipped with the control system 10 as used in an upright riding position on a horizontal surface.

The human-powered vehicle VH includes a drive train DT. The drive train DT includes a crank CR, a front sprocket assembly FS, a rear sprocket assembly RS, a chain C, a gear changing device RD, and a gear changing device FD. The front sprocket assembly FS is secured to the crank CR. The rear sprocket assembly RS is rotatably mounted to the vehicle body VH1. The chain C is engaged with the front sprocket assembly FS and the rear sprocket assembly RS. The gear changing device RD is mounted to the vehicle body VH1 and is configured to shift the chain C relative to the rear sprocket assembly RS to change a gear position. The gear changing device FD is mounted to the vehicle body VH1 and is configured to shift the chain C relative to the front sprocket assembly FS to change a gear position.

The human-powered vehicle VH includes a drive assist unit DU configured to apply assist driving force to the drive train DT. The drive assist unit DU includes an assist motor DU1 configured to generate the assist driving force.

Figure 2:
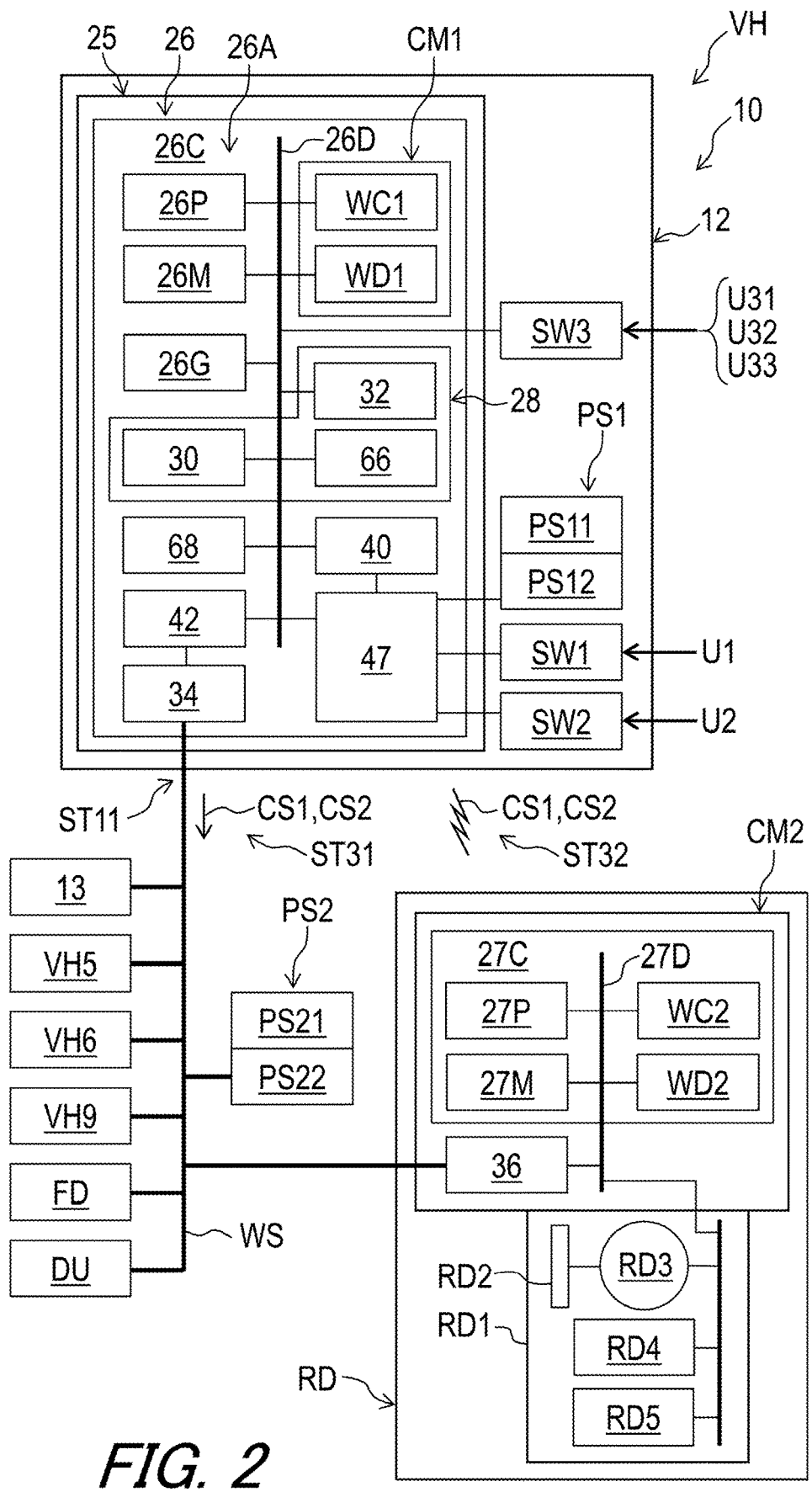
FIG. 2 is a schematic diagram of the human-powered vehicle illustrated in FIG. 1.

As seen in FIG. 2, the human-powered vehicle VH includes an operating device 12 and an operating device 13. The operating device 12 is configured to be electrically connected to the gear changing device RD. The operating device 13 is configured to be electrically connected to the gear changing device RD. The gear changing device RD is configured to be electrically connected to the gear changing device FD. In the present embodiment, each of the operating device 12 and the operating device 13 is configured to be electrically connected to the gear changing device RD through each of a wireless communication channel and a wired communication channel. However, at least one of the operating device 12 and the operating device 13 can be configured to be electrically connected to the gear changing device FD through each of the wireless communication channel and the wired communication channel.

The operating device 12 includes an electric switch SW1 and an electric switch SW2. The electric switch SW1 is configured to receive a user input U1. The electric switch SW2 is configured to receive a user input U2. In the present embodiment, each of the electric switch SW1 and the electric switch SW2 includes a normally open switch. The electric switch SW1 is configured to be turned on in response to the user input U1. The electric switch SW2 is configured to be turned on in response to the user input U2. However, the structures of the electric switches SW1 and SW2 are not limited to the normally open switch.

The human-powered vehicle VH includes a first electric power source PS1 and a second electric power source PS2. The first electric power source PS1 is configured to supply electric power to the operating device 12. The second electric power source PS2 is configured to supply electric power to at least one of the operating device 12, the operating device 13, the gear changing device RD, the gear changing device FD, the drive assist unit DU, the adjustable seatpost assembly VH5, the suspension VH6, and the display device VH9. In the present embodiment, the first electric power source PS1 is provided in the operating device 12, and the second electric power source PS2 is mounted to the vehicle body VH1 (see, e.g., FIG. 1). However, the first electric power source PS1 can be provided in other positions. The second electric power source PS2 can be provided in other positions.

The first electric power source PS1 includes a first battery PS11 and a first battery holder PS12. The first battery PS11 is configured to be detachably attached to the first battery holder PS12. The first battery PS11 is electrically connected to positive and negative contacts of the first battery holder PS12 in a state where the first battery P511 is attached to the first battery holder PS12. Examples of the first battery PS11 include a primary battery, a secondary battery, and a capacitor. In the present embodiment, the first battery PS11 includes the primary battery such as a button cell shaped as a flat cylinder. However, the construction of the first electric power source PS1 is not limited to the above examples.

The second electric power source PS2 includes a second battery PS21 and a second battery holder PS22. The second battery PS21 is configured to be detachably attached to the second battery holder PS22. The second battery PS21 is electrically connected to positive and negative contacts of the second battery holder PS22 in a state where the second battery PS21 is attached to the second battery holder PS22. Examples of the second battery PS21 include a primary battery, a secondary battery, and a capacitor. The second electric power source PS2 has a structure different from a structure of the first electric power source PS1. In the second embodiment, the second battery PS21 includes the secondary battery such as a rechargeable battery. However, the construction of the second electric power source PS2 is not limited to the above examples. The second electric power source PS2 can have the same structure as the structure of the first electric power source PS1. The second electric power source PS2 can include a primary battery.

The human-powered vehicle VH includes an electric wiring structure WS. The second electric power source PS2 is electrically connected to the operating device 12, the operating device 13, the gear changing device RD, the gear changing device FD, the drive assist unit DU, the adjustable seatpost assembly VH5, the suspension VH6, and the display device VH9 with the electric wiring structure WS. For example, the electric wiring structure WS includes at least one electric cable and/or at least one junction. However, the construction of the electric wiring structure WS is not limited to an electric cable and a junction.

Figure 3:
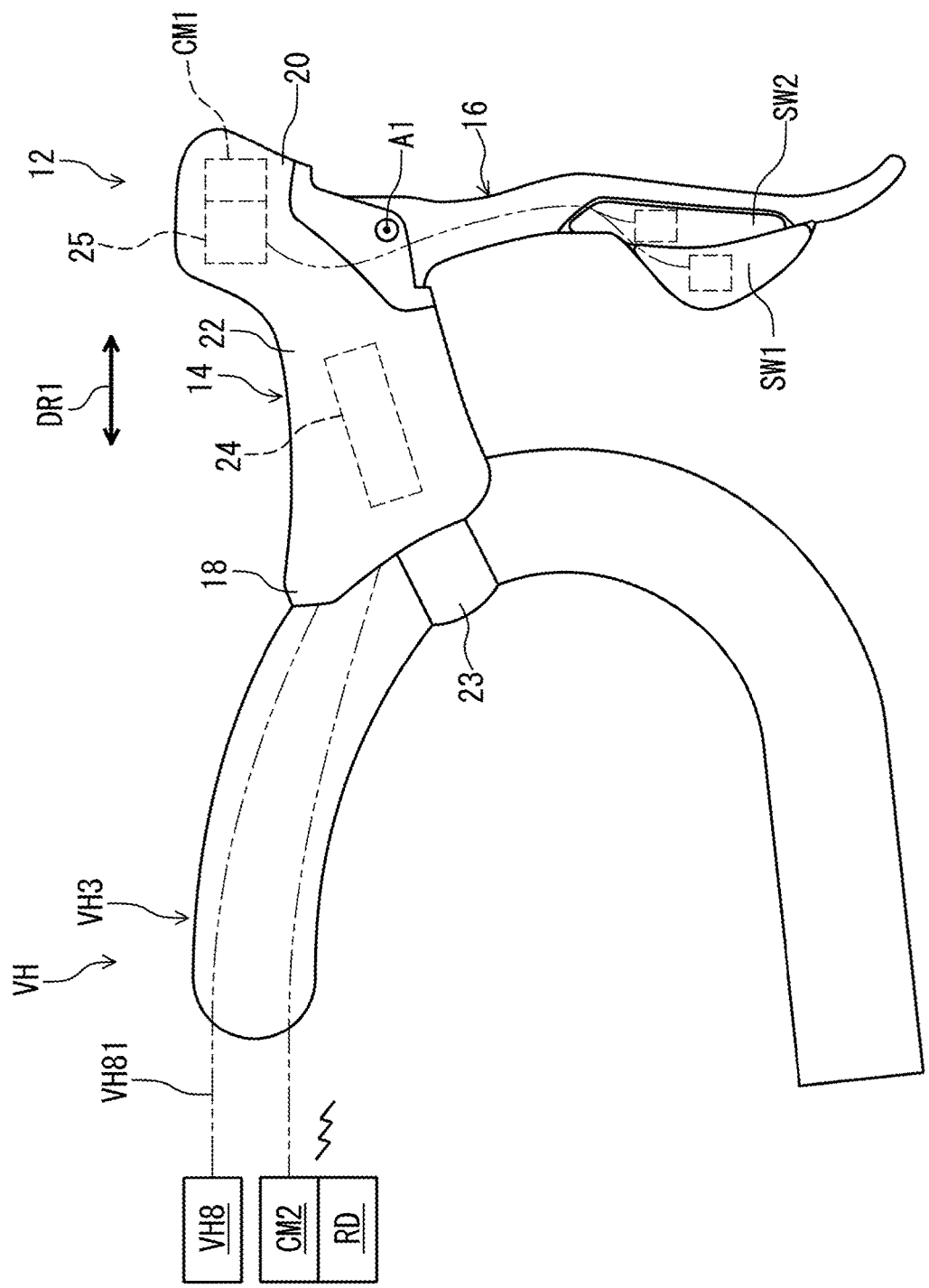
FIG. 3 is a side elevational view of an operating device of the human-powered vehicle illustrated in FIG. 1.

As seen in FIG. 3, the operating device 12 for the human-powered vehicle VH comprises a base member 14 and a movable member 16. The movable member 16 is pivotally coupled to the base member 14 about a pivot axis A1. The base member 14 extends in a longitudinal direction DR1. The base member 14 includes a first end portion 18, a second end portion 20, and a grip portion 22.

The first end portion 18 is configured to be coupled to the handlebar VH3. The second end portion 20 is opposite to the first end portion 18 in the longitudinal direction DR1. The second end portion 20 constitutes a free end of the base member 14. The grip portion 22 is provided between the first end portion 18 and the second end portion 20. The base member 14 extends between the first end portion 18 and the second end portion 20 in the longitudinal direction DR1. The operating device 12 includes a mounting structure 23 configured to couple the first end portion 18 to the handlebar 3.

The operating device 12 includes a hydraulic unit 24 provided in the base member 14. The hydraulic unit 24 is configured to generate hydraulic pressure in response to a movement of the movable member 16. For example, the hydraulic unit 24 includes a cylinder bore, a piston, a hydraulic chamber, a piston biasing member, and a reservoir. The hydraulic chamber is configured to be connected to the brake device VH8 with a hydraulic hose VH81. The movable member 16 is configured to be coupled to the piston. However, the movable member 16 can be operatively coupled to another structure instead of the hydraulic unit 24. For example, the movable member 16 can be operatively coupled to a mechanical control cable such as a Bowden cable so as to operate the brake device VH8.

The electric switches SW1 and SW2 are mounted to the movable member 16 to be movable relative to the base member 14 along with the movable member 16. However, at least one of the electric switches SW1 and SW2 can be mounted to other portions of the operating device 12 such as the base member 14.

In the present embodiment, the electric switch SW1 corresponds to upshifting of the gear changing device RD. The electric switch SW1 corresponds to downshifting of the gear changing device RD. However, at least one of the electric switches SW1 and SW2 can correspond to control of other electric components.

As seen in FIG. 2, the control system 10 for the human-powered vehicle VH comprises a control device 25. The operating device 12 for the human-powered vehicle VH comprises the control device 25. However, the control device 25 can be included in another device other than the operating device 12. The control device 25 can be provided separately from the operating device 12 or other devices.

The control system 10 for the human-powered vehicle VH comprises a first communicator CM1. The control device 25 is electrically connected to the first communicator CM1. The operating device 12 for the human-powered vehicle VH comprises the first communicator CML However, the first communicator CM1 can be included in another device other than the operating device 12.

The control system 10 for the human-powered vehicle VH comprises a second communicator CM2. The second communicator CM2 is coupled to at least one component of the human-powered vehicle VH. In the present embodiment, the at least one component includes one of the gear changing device RD or FD, the suspension VH6, the adjustable seatpost assembly VH5, the brake device VH7 or VH8, the display device VH9, and the drive assist unit DU. For example, the second communicator CM2 is coupled to the gear changing device RD. The second communicator CM2 is provided in the gear changing device RD. However, the second communicator CM2 can be coupled to other components such as the gear changing device FD, the suspension VH6, the adjustable seatpost assembly VH5, the brake device VH7 or VH8, the display device VH9, and the drive assist unit DU instead of or in addition to the gear changing device RD.

In the present embodiment, as seen in FIG. 3, the control device 25 and the first communicator CM1 are provided to the base member 14 of the operating device 12. Each of the control device 25 and the first communicator CM1 is at least partly provided to the second end portion 20 of the base member 14. However, at least one of the control device 25 and the first communicator CM1 can be at least partly provided to other portions of the operating device 12.

As seen in FIG. 2, the control device 25 for the first communicator CM1 of the human-powered vehicle VH is configured to establish one of a wireless communication and a wired communication with the second communicator CM2. The control device 25 comprises a power supply controller 26. The power supply controller 26 is configured to control a power supplying state of at least one of the first electric power source PS1 and the second electric power source PS2 to supply electric power to the first communicator CM1 based on at least one of a power-source state of at least one of the first electric power source PS1 and the second electric power source PS2 and a communication state between the first communicator CM1 and the second communicator CM2.

In the present embodiment, the power supply controller 26 is configured to control the power supplying state of at least one of the first electric power source PS1 and the second electric power source PS2 to supply electric power to the first communicator CM1 based on the power-source state of at least one of the first electric power source PS1 and the second electric power source PS2. However, the power supply controller 26 can be configured to control the power supplying state of at least one of the first electric power source PS1 and the second electric power source PS2 to supply electric power to the first communicator CM1 based on the communication state between the first communicator CM1 and the second communicator CM2.

The power supply controller 26 includes a controller 26A. The controller 26A includes a processor 26P, a memory 26M, a circuit board 26C, and a system bus 26D. The processor 26P and the memory 26M are electrically mounted on the circuit board 26C. The processor 26P includes a central processing unit (CPU) and a memory controller. The memory 26M is electrically connected to the processor 26P. The memory 26M includes a read only memory (ROM) and a random-access memory (RAM). The memory 26M includes storage areas each having an address in the ROM and the RAM. The processor 26P is configured to control the memory 26M to store data in the storage areas of the memory 26M and reads data from the storage areas of the memory 26M. The circuit board 26C, the electric switch SW1, and the electric switch SW2 are electrically connected to the system bus 26D. The electric switch SW1 and the electric switch SW2 are electrically connected to the processor 26P and the memory 26M with the circuit board 26C and the system bus 26D. The memory 26M (e.g., the ROM) stores a program. The program is read into the processor 26P, and thereby the configuration and/or algorithm of the power supply controller 26 is performed.

In the present embodiment, the first communicator CM1 includes a first wireless communicator WC1. The first wireless communicator WC1 is configured to establish the wireless communication with the second communicator CM2 using a wireless communication channel. The first wireless communicator WC1 is configured to wirelessly transmit control signals and/or information in response to the user input U1 or U2 received by the electric switch SW1 or SW2 through the wireless communication channel. The first wireless communicator WC1 is configured to wirelessly receive control signals and/or information through the wireless communication channel.

The first wireless communicator WC1 is configured to be electrically connected to the processor 26P and the memory 26M through the circuit board 26C and the system bus 26D. The first wireless communicator WC1 is configured to be electrically connected to the electric switch SW1 to generate and transmit a control signal CS1 in response to the user input U1. The first wireless communicator WC1 is configured to be electrically connected to the electric switch SW2 to generate and transmit a control signal CS2 in response to the user input U2.

The first wireless communicator WC1 includes a signal transmitting circuit, a signal receiving circuit, and an antenna. Thus, the first wireless communicator WC1 can also be referred to as a first wireless communication circuit WC1 or first wireless communication circuit circuitry WC1.

The first wireless communicator WC1 is configured to superimpose digital signals such as the control signals CS1 and CS2 on carrier wave using a predetermined wireless communication protocol to wirelessly transmit control signals such as the control signals CS1 and CS2. In the present embodiment, the first wireless communicator WC1 is configured to encrypt a control signal (e.g., the control signal CS1 or CS2) using a cryptographic key to generate encrypted wireless signals.

The first wireless communicator WC1 is configured to receives a wireless signal via the antenna. In the present embodiment, the first wireless communicator WC1 is configured to decode the wireless signal to recognize signals and/or information wirelessly transmitted from another wireless communicator. The first wireless communicator WC1 is configured to decrypt the wireless signal using the cryptographic key.

The second communicator CM2 includes a second wireless communicator WC2. The second wireless communicator WC2 is configured to establish the wireless communication with the first wireless communicator WC1 using the wireless communication channel. The second wireless communicator WC2 is configured to wirelessly transmit control signals and/or information. The second wireless communicator WC2 is configured to wirelessly receive control signals and/or information. The second wireless communicator WC2 is configured to be electrically connected to the gear changing device RD to transmit the control signals and/or the information to the gear changing device RD. The gear changing device RD is configured to execute upshifting in response to the control signal CS1 received by the second wireless communicator WC2. The gear changing device RD is configured to execute downshifting in response to the control signal CS2 received by the second wireless communicator WC2.

The second wireless communicator WC2 includes a signal transmitting circuit, a signal receiving circuit, and an antenna. Thus, the second wireless communicator WC2 can also be referred to as a second wireless communication circuit WC2 or second wireless communication circuit circuitry WC2.

The second wireless communicator WC2 is configured to superimpose a digital signal on carrier wave using a predetermined wireless communication protocol to wirelessly transmit a control signal. In the present embodiment, the second wireless communicator WC2 is configured to encrypt a control signal using a cryptographic key to generate encrypted wireless signals.

The second wireless communicator WC2 is configured to receives a wireless signal via the antenna. In the present embodiment, the second wireless communicator WC2 is configured to decode the wireless signal (e.g., the control signal CS1 or CS2) to recognize signals and/or information wirelessly transmitted from another wireless communicator such as the first wireless communicator WC1. The second wireless communicator WC2 is configured to decrypt the wireless signal (e.g., the control signal CS1 or CS2) using the cryptographic key.

The first communicator CM1 includes a first wired communicator WD1. The first wired communicator WD1 is configured to establish the wired communication with the second communicator CM2 using a wired communication channel. The first wired communicator WD1 is configured to transmit control signals and/or information in response to the user input U1 or U2 received by the electric switch SW1 or SW2 through the wired communication channel. The first wired communicator WD1 is configured to receive control signals and/or information through the wired communication channel.

The first wired communicator WD1 is configured to be electrically connected to the processor 26P and the memory 26M through the circuit board 26C and the system bus 26D. The first wired communicator WD1 is configured to be electrically connected to the electric switch SW1 to generate and transmit a control signal CS1 in response to the user input U1. The first wired communicator WD1 is configured to be electrically connected to the electric switch SW2 to generate and transmit a control signal CS2 in response to the user input U2.

The second communicator CM2 includes a second wired communicator WD2. The second wired communicator WD2 is configured to establish the wired communication with the first wired communicator WD1 using the wired communication channel. The second wired communicator WD2 is configured to transmit control signals and/or information in response to the user input U1 or U2 received by the electric switch SW1 or SW2 through the wired communication channel. The second wired communicator WD2 is configured to receive control signals and/or information through the wired communication channel.

The second wired communicator WD2 is configured to be electrically connected to the gear changing device RD to transmit the control signals and/or the information to the gear changing device RD. The gear changing device RD is configured to execute upshifting in response to the control signal CS1 received by the second wired communicator WD2. The gear changing device RD is configured to execute downshifting in response to the control signal CS2 received by the second wired communicator WD2.

The wired communication is established using power line communication (PLC) technology. The PLC carries data on a conductor that is also used simultaneously for electric power transmission or electric power distribution to the electric components. In the present embodiment, electric power is supplied from the second electric power source PS2 through the electric wiring structure WS to the operating device 12, the gear changing device RD, the gear changing device FD, and the drive assist unit DU. The electric wiring structure WS includes a ground line and a voltage line that are detachably connected to a serial bus that is formed by communication interfaces. The first wired communicator WD1 is configured to transmit and receive signals between the first wired communicator WD1 and other components such as the gear changing device RD, the gear changing device FD, and the drive assist unit DU through the electric wiring structure WS using the PLC. Thus, the operating device 12, the gear changing device RD, the gear changing device FD, and the drive assist unit DU can all communicate with each other through the voltage line of the electric wiring structure WS using the PLC technology.

The PLC uses unique device identification (ID) that is assigned to an electric component such as the operating device 12, the gear changing device RD, the gear changing device FD, and the drive assist unit DU. In the present embodiment, for example, the memory 26M is configured to store device information including unique device ID assigned to the operating device 12. The unique device ID can be used for the wireless communication of the first wireless communicator WC1 and the second wireless communicator WC2.

Based on the unique device ID, each of the first wired communicator WD1 and the second wired communicator WD2 is configured to recognize signals which are necessary for itself among signals transmitted via the wired communication channel. For example, the first wired communicator WD1 is configured to generate signals including the device information indicating the operating device 12. The second wired communicator WD2 is configured to generate signals including the device information indicating the gear changing device RD. The first wireless communicator WC1 is configured to generate wireless signals including the device information indicating the operating device 12. The second wireless communicator WC2 is configured to generate wireless signals including the device information indicating the gear changing device RD.

The first wired communicator WD1 is configured to recognize signals including device information as signals transmitted from the gear changing device RD, the gear changing device FD, and the drive assist unit DU via the wired communication channel. The first wired communicator WD1 is configured to separate input signals to a power source voltage and signals including device information of another electric component. The first wired communicator WD1 is configured to regulate an input voltage to a level at which the first communicator CM1 can properly operate. The first wired communicator WD1 is further configured to superimpose output signals such as signals including the device information of the operating device 12 on the power source voltage applied to the electric wiring structure WS from the second electric power source PS2.

The second wired communicator WD2 is configured to recognize signals including device information as signals transmitted from the gear changing device RD, the gear changing device FD, and the drive assist unit DU via the wired communication channel. The second wired communicator WD2 is configured to separate input signals to a power source voltage and signals including device information of another electric component. The second wired communicator WD2 is configured to regulate the power source voltage to a level at which the second communicator CM2 can properly operate. The second wired communicator WD2 is further configured to superimpose output signals such as signals including the device information of the gear changing device RD on the power source voltage applied to the electric wiring structure WS from the second electric power source PS2.

As seen in FIG. 2, the gear changing device RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is movably coupled to the base member RD1 and is configured to engage with the chain C (see e.g., FIG. 1). The actuator RD3 is configured to move the chain guide RD2 relative to the base member RD1 to shift the chain C relative to the rear sprocket assembly RS (see e.g., FIG. 1).

The actuator driver RD5 is electrically connected to the actuator RD3 to control the actuator RD3 based on the control signal CS1 and CS2 transmitted from the first communicator CM1 through the second communicator CM2. Examples of the actuator RD3 include a direct-current (DC) motor and a stepper motor. The actuator RD3 includes a rotational shaft operatively coupled to the chain guide RD2. The position sensor RD4 is configured to sense a current gear position of the gear changing device RD. Examples of the position sensor RD4 include a potentiometer and a rotary encoder. The position sensor RD4 is configured to sense an absolute rotational position of the rotational shaft of the actuator RD3 as the current gear position of the gear changing device RD. The actuator RD3 and the position sensor RD4 are electrically connected to the actuator driver RD5.

The actuator driver RD5 is configured to control the actuator RD3 to move the chain guide RD2 relative to the base member RD1 by one gear position in an upshift direction based on the control signal CS1 and the current gear position sensed by the position sensor RD4. The actuator driver RD5 is configured to control the actuator RD3 to move the chain guide RD2 relative to the base member RD1 by one gear position in a downshift direction based on the control signal CS2 and the current gear position sensed by the position sensor RD4.

The gear changing device FD has substantially the same structure as the structure of the gear changing device RD. Thus, it will not be described in detail here for the sake of brevity.

The second communicator CM2 includes a processor 27P, a memory 27M, a circuit board 27C, and a system bus 27D. The processor 27P and the memory 27M are electrically mounted on the circuit board 27C. The processor 27P includes a CPU and a memory controller. The memory 27M is electrically connected to the processor 27P. The memory 27M includes a ROM and a RAM. The memory 27M includes storage areas each having an address in the ROM and the RAM. The processor 27P is configured to control the memory 27M to store data in the storage areas of the memory 27M and reads data from the storage areas of the memory 27M. The circuit board 27C, the position sensor RD4, and the actuator driver RD5 are electrically connected to the system bus 27D. The position sensor RD4, and the actuator driver RD5 are electrically connected to the processor 27P and the memory 27M with the circuit board 27C and the system bus 27D. The memory 27M (e.g., the ROM) stores a program. The program is read into the processor 27P, and thereby the configuration and/or algorithm of the second communicator CM2 is performed.

The control device 25 further comprises a detector 28. The detector 28 is configured to detect the at least one of the power-source state and the communication state. In the present embodiment, the detector 28 is configured to detect the power-source state. The detector 28 is configured to detect the communication state. The detector 28 includes a power-source-state detector 30 configured to detect the power-source state. The detector 28 includes a communication-state detector 32 configured to detect the communication state. The communication-state detector 32 is a separate unit from the power-source-state detector 30. However, the communication-state detector 32 can be integrally provided with the power-source-state detector 30 as a single unit.

The detector 28 is configured to be electrically connected to the power supply controller 26. Each of the power-source-state detector 30 and the communication-state detector 32 is configured to be electrically connected to the power supply controller 26. Each of the power-source-state detector 30 and the communication-state detector 32 is configured to be electrically connected to the processor 26P and the memory 26M through the circuit board 26C and the system bus 26D. The power supply controller 26 is configured to receive the power-source state detected by the power-source-state detector 30 and the communication state detected by the communication-state detector 32.

The power supply controller 26 is configured to select one of the wireless communication and the wired communication based on the information relating to the human-powered vehicle VH. The power supply controller 26 is configured to select one of the first wireless communicator WC1 and the first wired communicator WD1 based on the information relating to the human-powered vehicle VH. Examples of the information include the power-source state detected by the power-source-state detector 30, an output voltage and/or an output current of the first electric power source PS1, an output voltage and/or an output current of the second electric power source PS2, a remaining level of the first electric power source PS1, and a remaining level of the second electric power source PS2. For example, the power supply controller 26 is configured to select the first wired communicator WD1 if electric power is supplied from the second electric power source PS2. The power supply controller 26 is configured to select the first wireless communicator WC1 if electric power is not supplied from the second electric power source PS2 and is supplied from the first electric power source PS1. The communication-state detector 32 is configured to detect a communicator selected by the power supply controller 26 from among the first wireless communicator WC1 and the first wired communicator WD1.

The control device 25 includes a connection port 34. The connection port 34 is configured to be connected to other components such as the second electric power source PS2, the gear changing device RD, the gear changing device FD, and the drive assist unit DU through the electric wiring structure WS. The connection port 34 is electrically connected to the detector 28 of the control device 25. The connection port 34 includes a connection hole in which a cable connector of an electric cable is to be inserted. The connection port 34 includes a port connector provided in the connection hole to be electrically connected to the cable connector of the electric cable. The port connector is configured to be electrically connected to the detector 28 of the control device 25.

The control device 25 is configured to communicate with other components through the connection port 34 in a state where the cable connector of the electric cable of the electric wiring structure WS is electrically connected to the connection port 34. The control device 25 is configured to receive electric power from the second electric power source PS2 through the connection port 34 in the state where the cable connector of the electric cable is electrically connected to the connection port 34. The detector 28 is configured to detect electric power supplied to the connection port 34 from the second electric power source PS2 in the state where the second electric power source PS2 is electrically connected to the connection port 34 through the electric cable. The detector 28 is configured to detect communication signals transmitted to the connection port 34 from at least one of the second electric power source PS2, the gear changing device RD, the gear changing device FD, and the drive assist unit DU in the state where the second electric power source PS2 is electrically connected to the connection port 34 through the electric wiring structure WS. The connection port 34 can also be referred to as a first connection port 34.

The second communicator CM2 includes a second connection port 36. The second connection port 36 is configured to be connected to other components such as the second electric power source PS2, the gear changing device RD, the gear changing device FD, and the drive assist unit DU through the electric wiring structure WS. The second connection port 36 is electrically connected to the second wired communicator WD2. The second connection port 36 includes a connection hole in which a cable connector of an electric cable is to be inserted. The second connection port 36 includes a port connector provided in the connection hole to be electrically connected to the cable connector of the electric cable. The port connector is configured to be electrically connected to the processor 27P and the memory 27M through the circuit board 27C and the system bus 27D.

The second communicator CM2 is configured to communicate with other components through the second connection port 36 in a state where the cable connector of the electric cable of the electric wiring structure WS is electrically connected to the second connection port 36. The second communicator CM2 is configured to receive electric power from the second electric power source PS2 through the second connection port 36 in the state where the cable connector of the electric cable is electrically connected to the second connection port 36.

Figure 4:
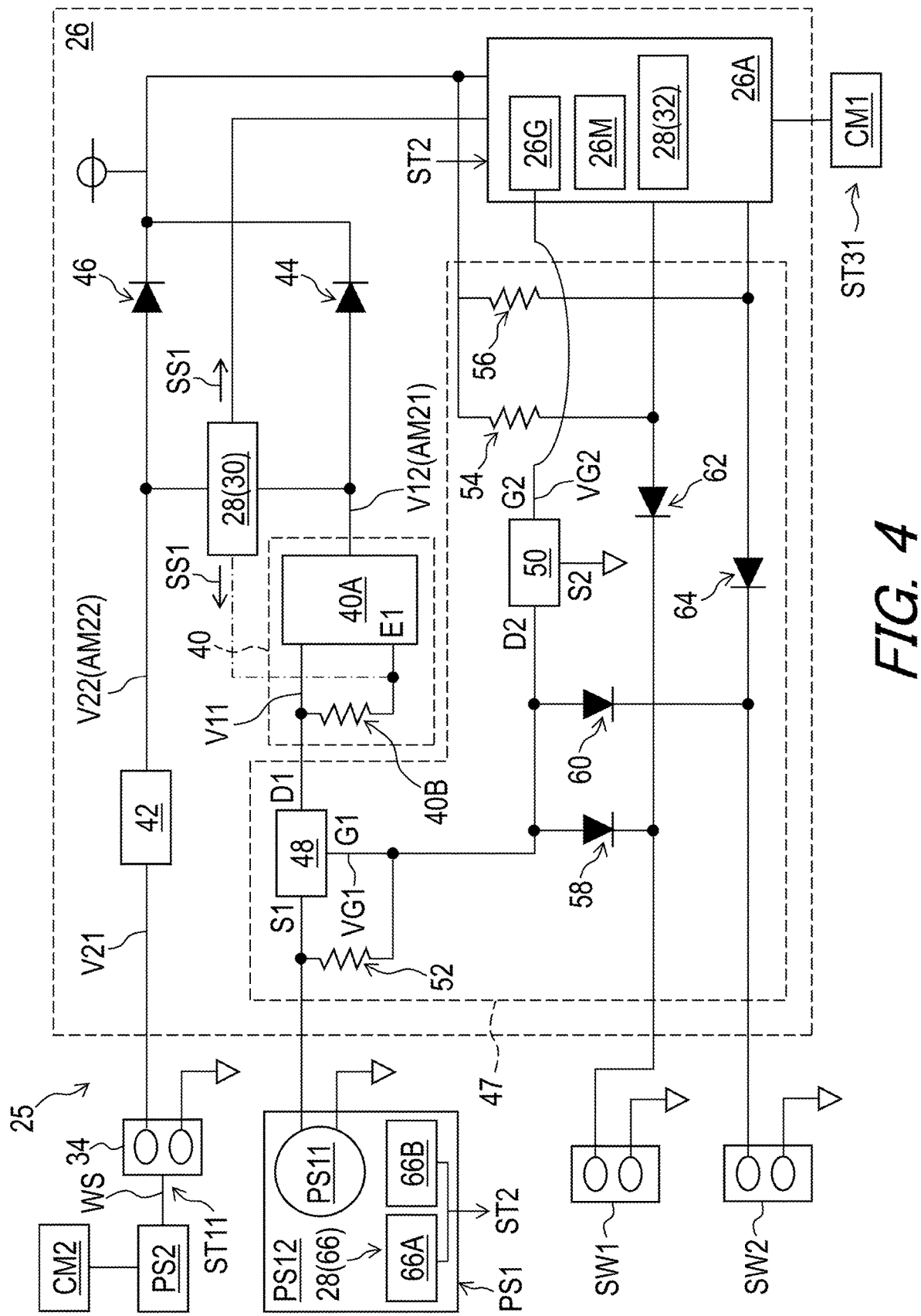
FIG. 4 is a schematic diagram of the control system of the human-powered vehicle illustrated in FIG. 1 (first connection state in second mode).

As seen in FIG. 4, the power supply controller 26 includes a first voltage controller 40 and a second voltage controller 42. The first voltage controller 40 is configured to convert a first input voltage V11 supplied from the first electric power source PS1. The second voltage controller 42 is configured to convert a second input voltage V21 supplied from the second electric power source PS2. The first voltage controller 40 is configured to convert the first input voltage V11 to a first predetermined voltage V12. The second voltage controller 42 is configured to convert the second input voltage V21 to a second predetermined voltage V22. The second input voltage V21 corresponds to the output voltage of the second electric power source PS2.

In the present embodiment, the first input voltage V11 is lower than the second input voltage V21. The first predetermined voltage V12 is equal to the second predetermined voltage V22. The first input voltage V11 is lower than the first predetermined voltage V12. The second input voltage V21 is higher than the second predetermined voltage V22. Thus, the first voltage controller 40 is configured to increase the first input voltage V11 to the first predetermined voltage V12. The second voltage controller 42 is configured to regulate the second input voltage V21 to the second predetermined voltage V22. The first voltage controller 40 includes a voltage converter 40A and a resistor 40B. The voltage converter 40A is configured to increase the first input voltage V11 to the first predetermined voltage V12. Examples of the voltage converter 40A include a DC-to-DC converter. The second voltage controller 42 includes a low-dropout (LDO) regulator configured to regulate the second input voltage V21 to a second predetermined voltage V22.

However, the first input voltage V11 can be equal to or higher than the second input voltage V21. The first input voltage V11 can be higher than the first predetermined voltage V12. The second input voltage V21 can be lower than the second predetermined voltage V22. The first voltage controller 40 can be configured to regulate the first input voltage V11 to the first predetermined voltage V12. The second voltage controller 42 can be configured to increase the second input voltage V21 to the second predetermined voltage V22. The first voltage controller 40 can include other circuits instead of or in addition to the DC-to-DC converter. The second voltage controller 42 can include other circuits instead of or in addition to the LDO regulator.

The power supply controller 26 includes diodes 44 and 46. The diode 44 is configured to allow a current to flow in one direction from the first voltage controller 40 to the controller 26A. The diode 46 is configured to allow a current to flow in one direction from the second voltage controller 42 to the controller 26A. The diode 44 is configured to restrict the current from flowing from the second voltage controller 42 to the first voltage controller 40. The diode 46 is configured to restrict the current from flowing from the first voltage controller 40 to the second voltage controller 42.

The controller 26A is electrically connected to the first voltage controller 40 to receive the first predetermined voltage V12 output from the first voltage controller 40. The controller 26A is electrically connected to the second voltage controller 42 to receive the second predetermined voltage V22 output from the second voltage controller 42. At least one of the first predetermined voltage V12 and the second predetermined voltage V22 applies to the first communicator CM1 through the controller 26A. Thus, the first communicator CM1 and the controller 26A are configured to be powered by each of the first electric power source PS1 and the second electric power source PS2.

The power supply controller 26 includes a third voltage controller 47. The third voltage controller 47 is configured to change a state of the third voltage controller 47 between an ON state and an OFF state based on control information. In the ON state, the third voltage controller 47 is configured to allow the flow of current from the first electric power source PS1 to the first communicator CM1. In the OFF state, the third voltage controller 47 is configured to interrupt the flow of current from the first electric power source PS1 to the first communicator CM1. The control information includes the control from the controller 26A, the activation of the electric switch SW1, and the activation of the electric switch SW2. The third voltage controller 47 is configured to change the state of the third voltage controller 47 from the ON state to the OFF state in response to the control from the controller 26A. The third voltage controller 47 is configured to change the state of the third voltage controller 47 from the OFF state to the ON state in response to the control from the controller 26A, the activation of the electric switch SW1, or the activation of the electric switch SW2. Thus, the electric switches SW1 and SW2 serve as a power-on switch.

The third voltage controller 47 includes a first field-effect transistor (FET) 48. The first FET 48 is configured to control the flow of current between a first source terminal S1 and a first drain terminal D1 in response to a first gate voltage VG1 applied to a first gate terminal G1. The first FET 48 is configured to allow the flow of current between the first source terminal S1 and the first drain terminal D1 while the first gate voltage VG1 applied to the first gate terminal G1 is higher than a first threshold voltage. The first FET 48 is configured to interrupt the flow of current between the first source terminal S1 and the first drain terminal D1 while the first gate voltage VG1 applied to the first gate terminal G1 is equal to or lower than the first threshold voltage. The output voltage of the first electric power source PS1 is higher than the first threshold voltage. For example, the first FET 48 includes a p-type metal-oxide-semiconductor field-effect transistor (MOSFET). However, the first FET 48 can include other FETs such as a n-type MOSEFT.

The third voltage controller 47 includes a second field-effect transistor (FET) 50. The second FET 50 is configured to control the flow of current between a second source terminal S2 and a second drain terminal D2 in response to a second gate voltage VG2 applied to a second gate terminal G2. The second FET 50 is configured to allow the flow of current between the second source terminal S2 and the second drain terminal D2 while the second gate voltage VG2 applied to the second gate terminal G2 is higher than a second threshold voltage. The second FET 50 is configured to interrupt the flow of current between the second source terminal S2 and the second drain terminal D2 while the second gate voltage VG2 applied to the second gate terminal G2 is equal to or lower than the second threshold voltage. The second drain terminal D2 is electrically connected to the first gate terminal G1 of the first FET 48 to supply the first gate voltage VG1 to the first gate terminal G1. The second gate terminal G2 is electrically connected to the controller 26A. The controller 26A includes a gate driver 26G configured to apply the second gate voltage VG2 to the second gate terminal G2. The output voltage of the second FET 50 is higher than the first threshold voltage. The second gate voltage VG2 applied from the gate driver 26G of the controller 26A is higher than the second threshold voltage. For example, the second FET 50 includes a n-type MOSFET. However, the second FET 50 can include other FETs such as a p-type MOSEFT.

The third voltage controller 47 includes a first pull-up resistor 52, a second pull-up resistor 54, and a third pull-up resistor 56. The first pull-up resistor 52 is configured to hold the first gate voltage VG1 applied to the first gate terminal G1 of the first FET 48 in response to the activation of one of the electric switches SW1 and SW2. The second pull-up resistor 54 is configured to hold a voltage applied from the first voltage controller 40 to the controller 26A in response to the activation of the electric switch SW1. The third pull-up resistor 56 is configured to hold a voltage applied from the first voltage controller 40 to the controller 26A in response to the activation of the electric switch SW2.

The third voltage controller 47 includes a first diode 58, a second diode 60, a third diode 62, and a fourth diode 64. The first diode 58 is configured to allow a current to flow in one direction. The second diode 60 is configured to allow a current to flow in one direction. The third diode 62 is configured to allow a current to flow in one direction. The fourth diode 64 is configured to allow a current to flow in one direction.

When one of the electric switches SW1 and SW2 is turned on in a state where the third voltage controller 47 is in the OFF state, the first gate voltage VG1 is applied from the first electric power source PS1 to the first gate terminal G1 of the first FET 48 by the action of the first pull-up resistor 52. Thus, the first FET 48 allows a current to flow from the first source terminal S1 to the first drain terminal D1 in response to the first gate voltage VG1 applied from the first electric power source PS1 to the first gate terminal G1 of the first FET 48.

The first voltage controller 40 controls the first input voltage V11 applied from the first FET 48 to the controller 26A at the first predetermined voltage V12. The first predetermined voltage V12 applied from the first voltage controller 40 to the controller 26A is held by the action of the second pull-up resistor 54 if the electric switch SW1 is turned on. The first predetermined voltage V12 applied from the first voltage controller 40 to the controller 26A is held by the action of the third pull-up resistor 56 if the electric switch SW2 is turned on. Thus, the controller 26A is powered by the first electric power source PS1 through the first voltage controller 40 and the third voltage controller 47.

The controller 26A detects the operation of the electric switch SW1 or SW2 after the power supply controller 26 is turned on. The gate driver 26G of the controller 26A is configured to apply the second gate voltage VG2 to the second gate terminal G2 of the second FET 50 in response to the operation of one of the electric switches SW1 and SW2. The first gate voltage VG1 is applied from the second FET 50 to the first gate terminal G1 of the first FET 48 while the controller 26A applied the second gate voltage VG2 to the second gate terminal G2 of the second FET 50. This maintains supply of electric power from the first electric power source PS1 to the controller 26A after one of the electric switches SW1 and SW2 is turned off.

The first gate voltage VG1 applied from the second FET 50 to the first gate terminal G1 of the first FET 48 is stopped when the controller 26A stops supplying the second gate voltage VG2 to the second gate terminal G2, stopping supply of the first gate voltage VG1 from the second FET 50 to the first gate terminal G1. Thus, the controller 26A is configured to stop supplying electric power from the first electric power source PS1 to the controller 26A if the OFF condition is satisfied. The first FET 48 has a leakage current having a current value lower than a current value of minimum electric power of the controller 26A when the first FET 48 is in the OFF state. Thus, the controller 26A is configured to change a mode of the power supply controller 26 from a wake mode to a sleep mode by stopping supply of the second gate voltage VG2.

In a modification, the voltage converter 40A of the first voltage controller 40 can include a terminal E1 configured to change a state of the first voltage controller 40 between an activation state and a deactivation state, if needed and/or desired. For example, in the activation state, the voltage converter 40A of the first voltage controller 40 is activated and converts the first input voltage V11 to the first predetermined voltage V12. Namely, the first voltage converter 40 allows electric power to be supplied from the first electric power source PS1 to the first communicator CM1 in the deactivation state. In the deactivation state, the voltage converter 40A of the first voltage controller 40 is deactivated and does not convert the first input voltage V11. Namely, the first voltage converter 40 interrupts supply of electric power from the first electric power source PS1 to the first communicator CM1 in the deactivation state. The resistor 40B of the first voltage controller 40 is electrically connected to the terminal E1.

The power-source-state detector 30 is electrically connected to the controller 26A, the output line of the first voltage controller 40, and the output line of the second voltage controller 42. In the modification, the power-source-state detector 30 can be electrically connected to the terminal E1 of the first voltage controller 40 instead of or in addition to the controller 26A. The power-source-state detector 30 is configured to manage a voltage difference between a first output voltage of the first voltage controller 40 and a second output voltage of the second voltage controller 42. The power-source-state detector 30 is configured to compare the voltage difference with a predetermined threshold. The power-source-state detector 30 is configured to output a first state signal (e.g., a low-level signal) SS1 if the voltage difference is equal to or lower than the predetermined threshold. The power-source-state detector 30 is configured to output a second state signal (e.g., a high-level signal) SS2 (see, e.g., FIG. 8) if the voltage difference is higher than the predetermined threshold. Namely, the power-source-state detector 30 is configured to output the first state signal SS1 if the second electric power source PS2 is connected to the connection port 34. The power-source-state detector 30 is configured to output the second state signal SS2 (see, e.g., FIG. 8) if the second electric power source PS2 is not connected to the connection port 34.

As seen in FIG. 2, the power supply controller 26 has a first mode, a second mode, and a third mode. The power supply controller 26 is configured to change a mode of the power supply controller 26 among the first mode, the second mode, and the third mode. The control device 25 includes a mode select switch SW3. The mode select switch SW3 is configured to receive a first mode user input U31, a second mode user input U32, and a third mode user input U33. The power supply controller 26 is configured to change the mode of the power supply controller 26 to the first mode in response to the first mode user input U31 received by the mode select switch SW3. The power supply controller 26 is configured to change the mode of the power supply controller 26 to the second mode in response to the second mode user input U32 received by the mode select switch SW3. The power supply controller 26 is configured to change the mode of the power supply controller 26 to the third mode in response to the third mode user input U33 received by the mode select switch SW3.

As seen in FIGS. 4 to 8, the power supply controller 26 is configured to control the power supplying state in accordance with the power-source state detected by the detector 28. The power supply controller 26 is configured to control the power supplying state in accordance with the power-source state detected by the power-source-state detector 30.

Figure 5:
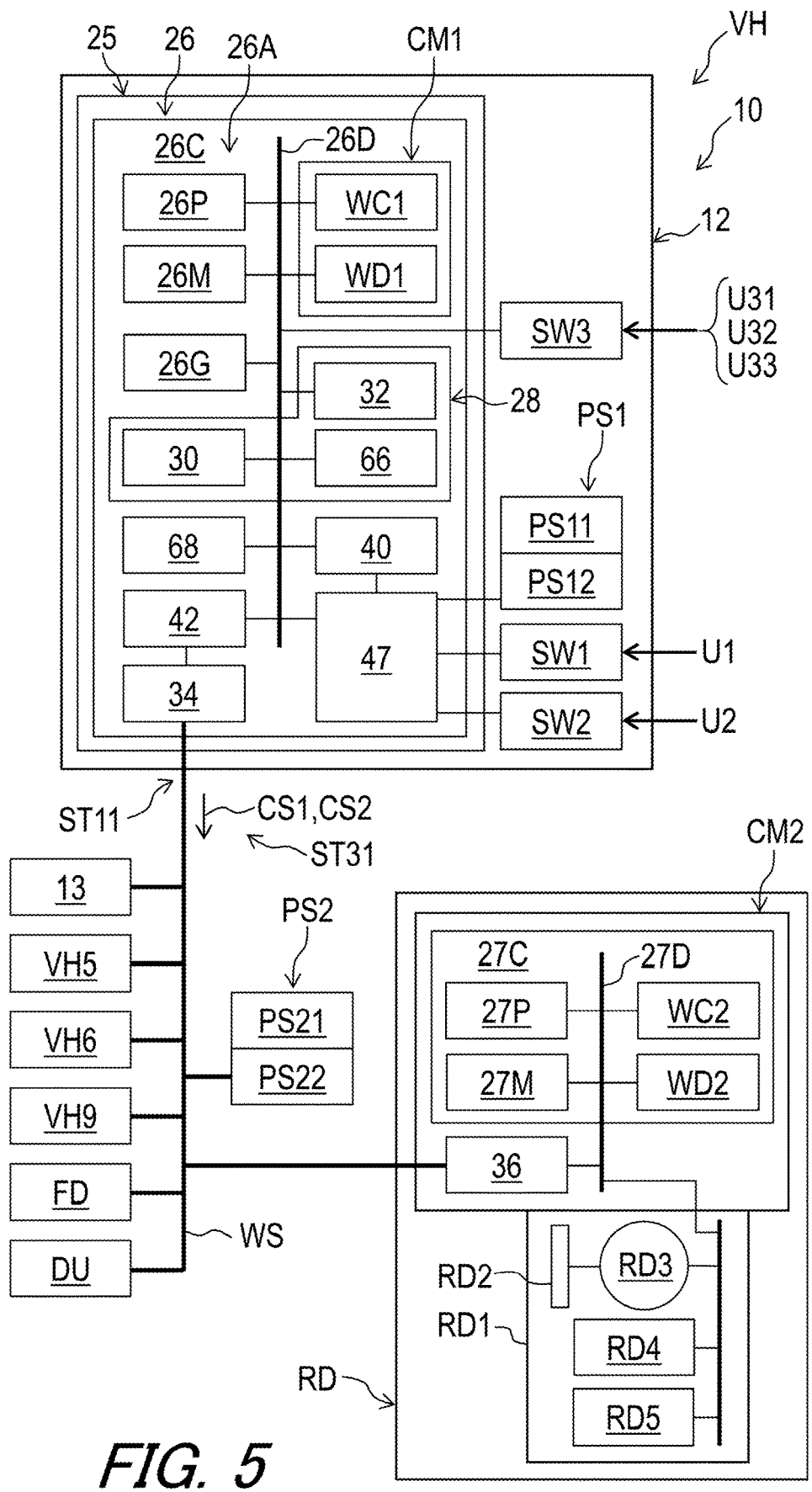
FIG. 5 is a schematic diagram of the human-powered vehicle illustrated in FIG. 1 (first connection state in first or second mode, first communication state in third mode).
Figure 6:
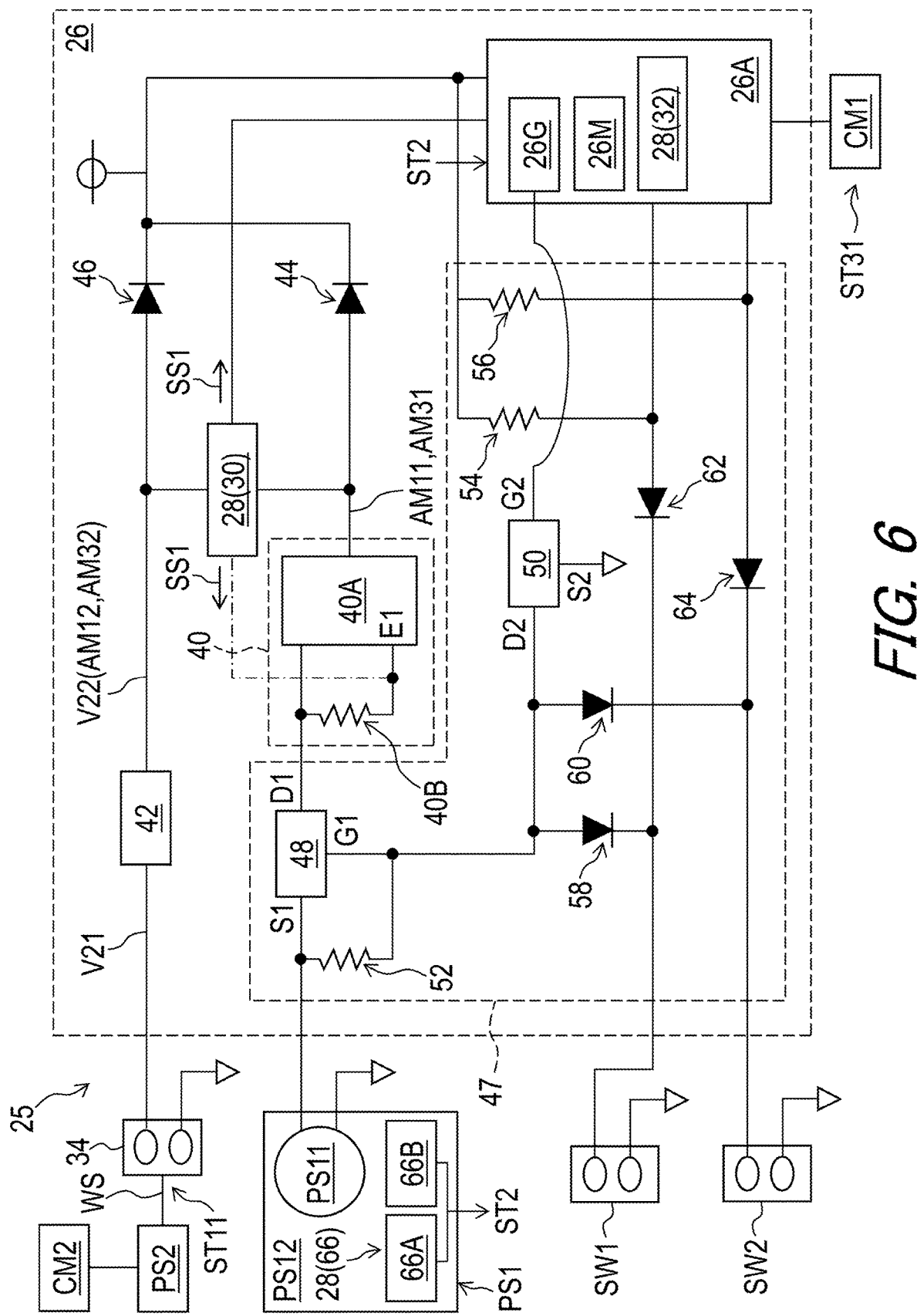
FIG. 6 is a schematic diagram of the control system of the human-powered vehicle illustrated in FIG. 1 (first connection state in first mode).

As seen in FIGS. 5 and 6, the power-source state includes a first connection state ST11 where the second electric power source PS2 is connected to the connection port 34. The detector 28 is configured to detect the first connection state ST11. The power-supplying-state detector 30 is configured to detect the first connection state ST11. The power-supplying-state detector 30 is configured to output the first state signal SS1 to the power supply controller 26 if the power-supplying-state detector 30 detects the first connection state ST11. Thus, the power supply controller 26 is configured to recognize the first connection state ST11 based on the first state signal SS1 output from the power-supplying-state detector 30.

Figure 7:
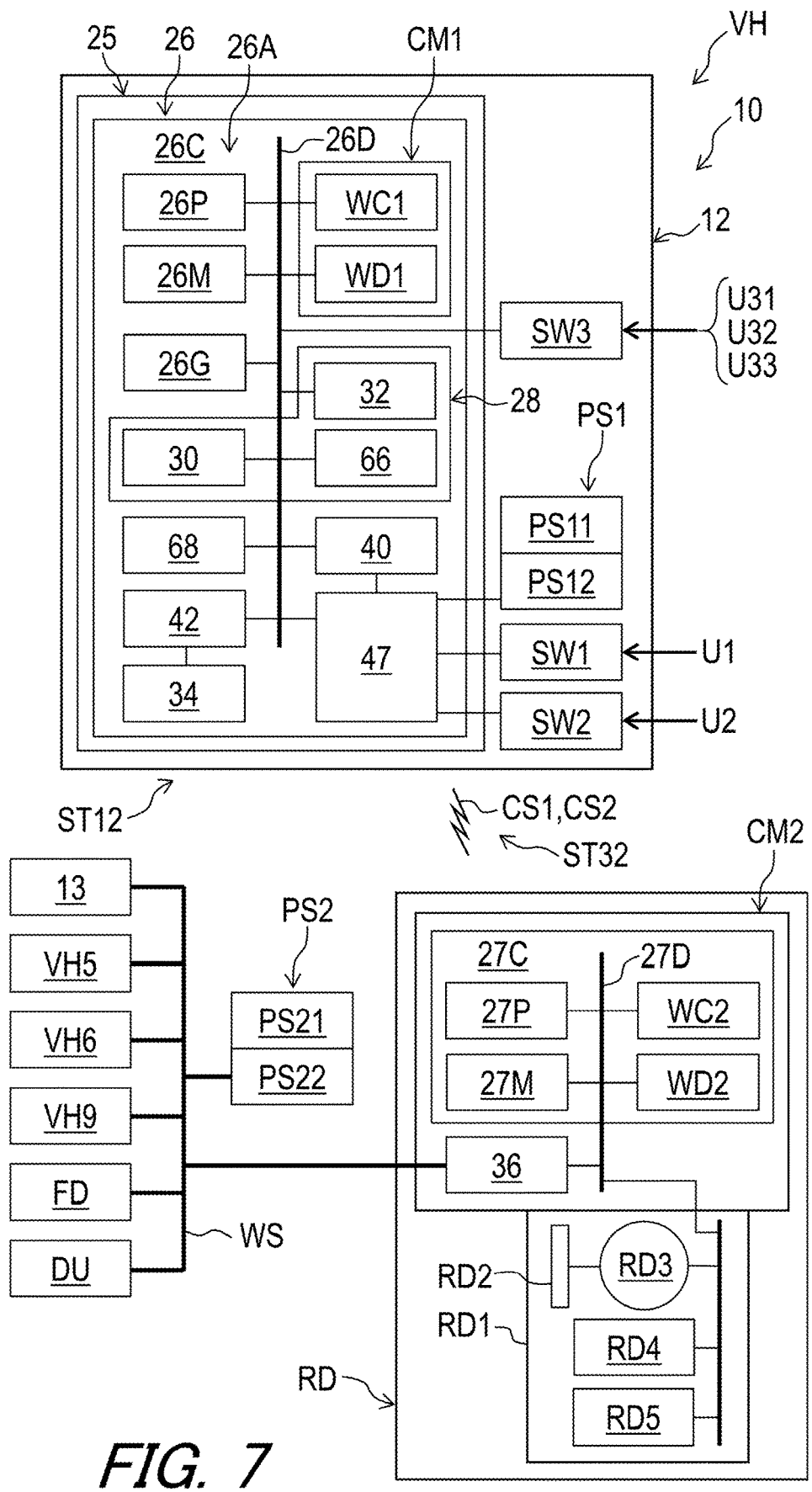
FIG. 7 is a schematic diagram of the human-powered vehicle illustrated in FIG. 1 (second connection state in first or second mode).
Figure 8:
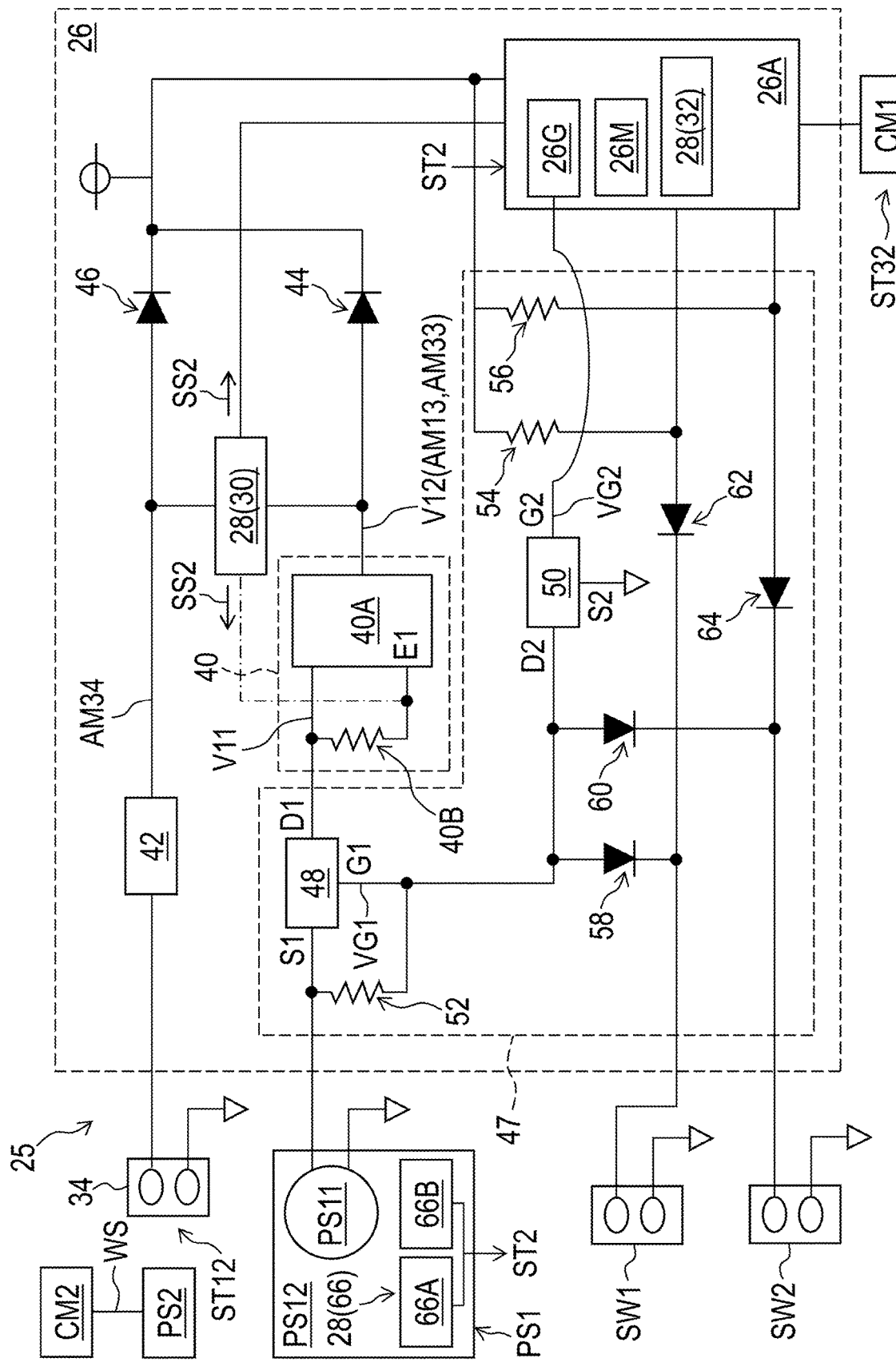
FIG. 8 is a schematic diagram of the control system of the human-powered vehicle illustrated in FIG. 1 (second connection state in first or second mode, second communication state in third mode).

As seen in FIGS. 7 and 8, the power-source state includes a second connection state ST12 where the second electric power source PS2 is not connected to the connection port 34. The detector 28 is configured to detect the second connection state ST12. The power-supplying-state detector 30 is configured to detect the second connection state ST12. The power-supplying-state detector 30 is configured to output the second state signal SS2 to the power supply controller 26 if the power-supplying-state detector 30 detects the second connection state ST12. Thus, the power supply controller 26 is configured to recognize the second connection state ST12 based on the second state signal SS2 output from the power-supplying-state detector 30.

As seen in FIG. 6, in the first mode, the power supply controller 26 is configured to control electric power supplied from the first electric power source PS1 to the first communicator CM1 to have a first amount AM11 in accordance with the first connection state ST11 detected by the detector 28. In the first mode, the power supply controller 26 is configured to control electric power supplied from the second electric power source PS2 to the first communicator CM1 to have a second amount AM12 in accordance with the first connection state ST11 detected by the detector 28.

In the present embodiment, the first amount AM11 is zero. The second amount AM12 is larger than the first amount AM11. The second amount AM12 is larger than zero. However, the first amount AM11 can be larger than zero if needed and/or desired. The second amount AM12 can be equal to or smaller than the first amount AM11 if needed and/or desired. The second amount AM12 can be zero if needed and/or desired.

The power supply controller 26 is configured to control electric power supplied from the second electric power source PS2 to the first communicator CM1 to have the second amount AM12 if the power-supplying-state detector 30 detects the first connection state ST11. The second voltage controller 42 is configured to convert the second input voltage V21 supplied from the second electric power source PS2 to the second amount AM12 if the second electric power source PS2 is connected to the connection port 34 of the control device 25. Namely, the second amount AM12 corresponds to the second predetermined voltage V22 which is the output voltage of the second voltage controller 42.

The power supply controller 26 is configured to control electric power supplied from the first electric power source PS1 to the first communicator CM1 to have the first amount AM11 which is zero if the power-supplying-state detector 30 detects the first connection state ST11. Specifically, the power-supplying-state detector 30 is configured to output the first state signal SS1 if the power-supplying-state detector 30 detects the first connection state ST11. The controller 26A is configured to stop supplying the second gate voltage VG2 to the second FET 50 of the third voltage controller 47 if the controller 26A receives the first state signal SS1 from the power-supplying-state detector 30. The second FET 50 is configured to stop supplying the first gate voltage VG1 to the first FET 48 of the third voltage controller 47 in response to stop of the second gate voltage VG2. The first FET 48 is configured to interrupt the flow of current from the first electric power source PS1 to the first voltage controller 40 in response to stop of the first gate voltage VG1. Thus, the power supply controller 26 is configured to stop supply of electric power from the first electric power source PS1 to the first communicator CM1 if the second electric power source PS2 is connected to the connection port 34 of the control device 25. However, the voltage converter 40A of the first voltage controller 40 can be configured to change the state of the voltage converter 40A from the activation state to the deactivation state in response to the first state signal SS1. The voltage converter 40A of the first voltage controller 40 can be configured to change the state of the voltage converter 40A from the deactivation state to the activation state in response to the second state signal SS2. In such a modification, the first voltage controller 40 interrupts supply of electric power from the first electric power source PS1 to the first communicator CM1 in response to the first state signal SS1 instead of or in addition to the third voltage controller 47. The first voltage controller 40 allows electric power to be supplied from the first electric power source PS1 to the first communicator CM1 in response to the second state signal SS2 instead of or in addition to the third voltage controller 47.

In the present embodiment, the first amount AM11 is a voltage of the electric power supplied from the first electric power source PS1 to the first communicator CM1. The second amount AM12 is a voltage of the electric power supplied from the second electric power source PS2 to the first communicator CM1. However, at least one of the first amount AM11 and the second amount AM12 can be other physical amount such as a current or electric energy.

As seen in FIG. 4, in the second mode, the power supply controller 26 is configured to control electric power supplied from the first electric power source PS1 to the first communicator CM1 to have a first amount AM21 in accordance with the first connection state ST11 detected by the detector 28. In the second mode, the power supply controller 26 is configured to control electric power supplied from the second electric power source PS2 to the first communicator CM1 to have a second amount AM22 in accordance with the first connection state ST11 detected by the detector 28.

In the present embodiment, the first amount AM21 and the second amount AM22 are larger than zero. The second amount AM22 is equal to the first amount AM21. The second amount AM22 in the second mode is equal to the second amount AM12 in the first mode. However, the second amount AM22 in the second mode can be different from the second amount AM12 in the first mode. The second amount AM22 can be different from the first amount AM21.

The power supply controller 26 is configured to control electric power supplied from the second electric power source PS2 to the first communicator CM1 to have the second amount AM22 if the power-supplying-state detector 30 detects the first connection state ST11. The second voltage controller 42 is configured to convert the second input voltage V21 supplied from the second electric power source PS2 to the second amount AM22 if the second electric power source PS2 is connected to the connection port 34 of the control device 25. Namely, the second amount AM22 corresponds to the second predetermined voltage V22 which is the output voltage of the second voltage controller 42.

The power supply controller 26 is configured to control electric power supplied from the first electric power source PS1 to the first communicator CM1 to have the first amount AM21 which is zero if the power-supplying-state detector 30 detects the first connection state ST11. Specifically, the power-supplying-state detector 30 is configured to output the first state signal SS1 if the power-supplying-state detector 30 detects the first connection state ST11. Unlike the first mode, the controller 26A is configured to keep supplying the second gate voltage VG2 to the second FET 50 of the third voltage controller 47 if the controller 26A receives the first state signal SS1 from the power-supplying-state detector 30. The second FET 50 is configured to keep supplying the first gate voltage VG1 to the first FET 48 of the third voltage controller 47 in response to the second gate voltage VG2. The first FET 48 is configured to allow the flow of current from the first electric power source PS1 to the first voltage controller 40 in response to the first gate voltage VG1. Thus, the power supply controller 26 is configured to allow supply of electric power from the first electric power source PS1 to the first communicator CM1 if the second electric power source PS2 is connected to the connection port 34 of the control device 25. Namely, the first communicator CM1 is powered by the first electric power source PS1 and the second electric power source PS2.

In the present embodiment, the first amount AM21 is a voltage of the electric power supplied from the first electric power source PS1 to the first communicator CM1. The second amount AM22 is a voltage of the electric power supplied from the second electric power source PS2 to the first communicator CM1. However, at least one of the first amount AM21 and the second amount AM22 can be other physical amount such as a current or electric energy.

In each of the first mode and the second mode, the first wired communicator WD1 is configured to establish the wired communication with the second wired communicator WD2 if the detector 28 detects the first connection state ST11. In each of the first mode and the second mode, the first wireless communicator WC1 is configured not to establish the wireless communication with the second wireless communicator WC2 if the detector 28 detects the first connection state ST11.

As seen in FIGS. 7 and 8, in each of the first mode and the second mode, the power supply controller 26 is configured to control electric power supplied from the first electric power source PS1 to the first communicator CM1 to have a first amount AM13 in accordance with the second connection state ST12 detected by the detector 28. In the present embodiment, the first amount AM13 is larger than zero. Electric power is not supplied from the second electric power source PS2 to the first communicator CM1 since the second electric power source PS2 is not connected to the connection port 34.

As seen in FIG. 8, the power supply controller 26 is configured to control electric power supplied from the first electric power source PS1 to the first communicator CM1 to have the first amount AM13 which is larger than zero if the power-supplying-state detector 30 detects the second connection state ST12. Specifically, the power-supplying-state detector 30 is configured to output the second state signal SS2 if the power-supplying-state detector 30 detects the first connection state ST11. The controller 26A is configured to keep supplying the second gate voltage VG2 to the second FET 50 of the third voltage controller 47 if the controller 26A receives the second state signal SS2 from the power-supplying-state detector 30. The second FET 50 is configured to keep supplying the first gate voltage VG1 to the first FET 48 of the third voltage controller 47 in response to stop of the second gate voltage VG2. The first FET 48 is configured to allow the flow of current from the first electric power source PS1 to the first voltage controller 40 while the first gate voltage VG1 is supplied to the first gate terminal G1 of the first FET 48. Thus, the power supply controller 26 is configured to allow supply of electric power from the first electric power source PS1 to the first communicator CM1 if the second electric power source PS2 is not connected to the connection port 34 of the control device 25.

In the present embodiment, the first amount AM13 is a voltage of the electric power supplied from the first electric power source PS1 to the first communicator CM1. However, the first amount AM13 can be other physical amount such as a current or electric energy.

In each of the first mode and the second mode, the first wireless communicator WC1 is configured to establish the wireless communication with the second wireless communicator WC2 if the detector 28 detects the second connection state ST12. In each of the first mode and the second mode, the first wired communicator WD1 is configured not to establish the wired communication with the second wired communicator WD2 if the detector 28 detects the second connection state ST12.

As seen in FIG. 4, the power-source state includes an electrical-loading state ST2 of the first electric power source PS1. The detector 28 is configured to detect the electrical-loading state ST2. The detector 28 includes an electrical-loading-state detector 66 configured to detect the electrical-loading state ST2. The electrical-loading-state detector 66 is configured to be electrically connected to the power supply controller 26. The electrical-loading-state detector 66 is configured to be electrically connected to the processor 26P and the memory 26M through the circuit board 26C and the system bus 26D. The controller 26A is configured to receive the electrical-loading state ST2 detected by the electrical-loading-state detector 66.

In the second mode, the power supply controller 26 is configured to control the power supplying state based on comparison between the electrical-loading state ST2 detected by the detector 28 and a predetermined electrical-loading state. The power supply controller 26 is configured to control the power supplying state based on comparison between the electrical-loading state ST2 detected by the electrical-loading-state detector 66 and the predetermined electrical-loading state. The memory 26M is configured to store the predetermined electrical-loading state. The power supply controller 26 is configured to control the power supplying state based on comparison between the electrical-loading state ST2 detected by the electrical-loading-state detector 66 and the predetermined electrical-loading state.

The power supply controller 26 is configured to stop supply of electric power from the first electric power source PS1 to the first communicator CM1 if the power supply controller 26 concludes that the first electric power source PS1 does not satisfy the predetermined electrical-loading state. The power supply controller 26 is configured to allow supply of electric power from the first electric power source PS1 to the first communicator CM1 if the power supply controller 26 concludes that the first electric power source PS1 satisfies the predetermined electrical-loading state. In the present embodiment, for example, the predetermined electrical-loading state includes a state in which the first electric power source PS1 properly supplies electric power to the power supply controller 26 and the first communicator CM1.

The electrical-loading state ST2 relates to at least one of a voltage, a current, resistance, a temperature, a power threshold, and a priority level of the first electric power source PS1. For example, the resistance of the first electric power source PS1 includes internal resistance of the first electric power source PS1. The priority level of the first electric power source PS1 includes a difference between a first remaining level of the first electric power source PS1 and a second remaining level of the second electric power source PS2. For example, the first electric power source PS1 is given priority over the second electric power source PS2 if the first remaining level of the first electric power source PS1 is greater than the second remaining level of the second electric power source PS2. The second electric power source PS2 is given priority over the first electric power source PS1 if the second remaining level of the second electric power source PS2 is equal to or greater than the first remaining level of the first electric power source PS1 The power supply controller 26 is configured to use one given priority over another of the first electric power source PS1 and the second electric power source PS2.

Figure 9:
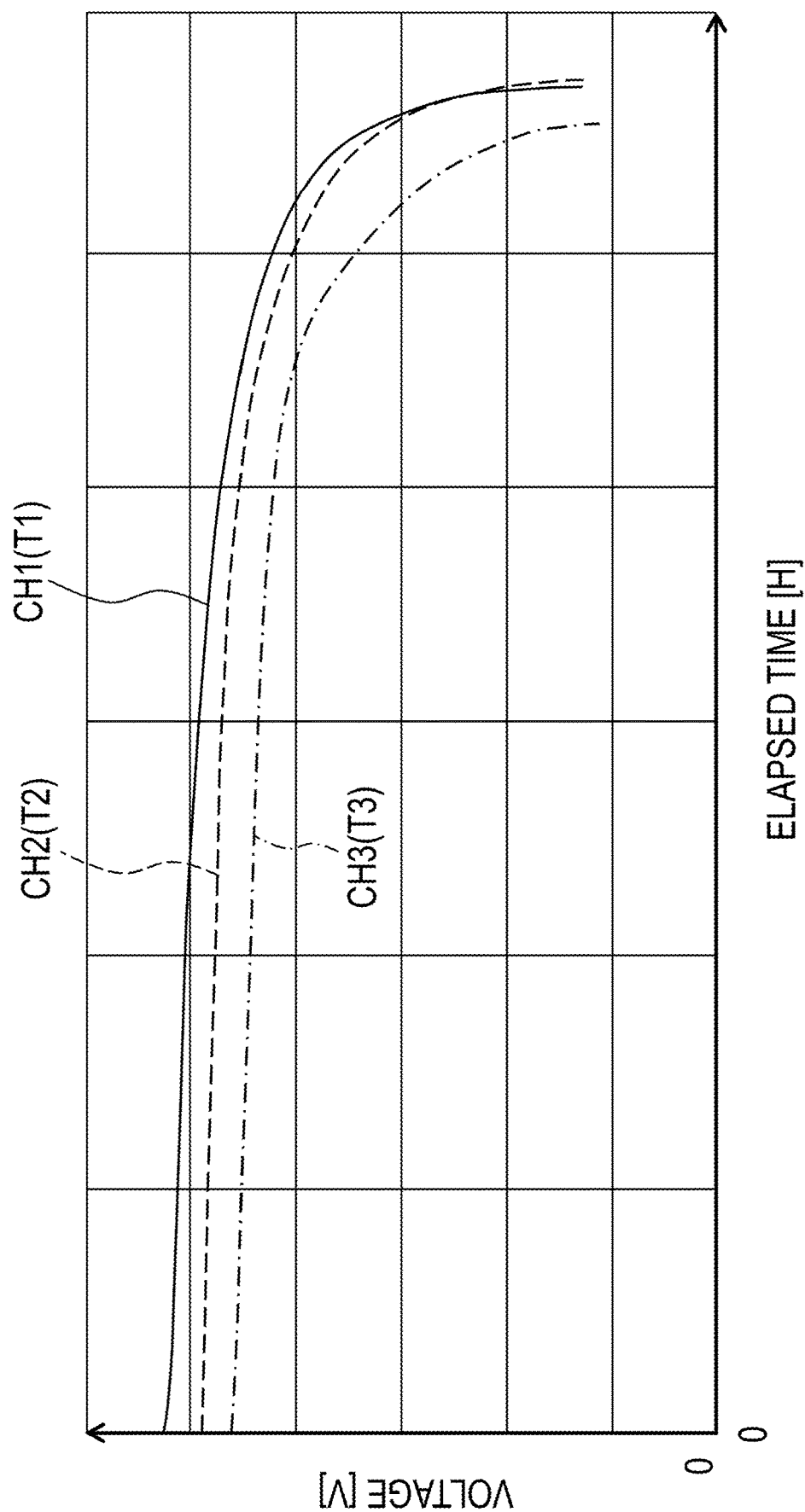
FIG. 9 shows a relationship between a voltage and an elapsed time of a battery varies depending on a temperature of the battery.

As seen in FIG. 9, a relationship between a voltage and an elapsed time of a battery varies depending on a temperature of the battery when the battery is connected to a specific load. For example, the battery has a first characteristic CH1 under a first temperature T1. The battery has a second characteristic CH2 under a second temperature T2. The battery has a third characteristic CH3 under a third temperature T3. The first temperature T1 is higher than the second temperature T2 and the third temperature T3. The second temperature T2 is higher than the third temperature T3. A graph of FIG. 9 shows a higher temperature of the battery makes a voltage of the battery higher at the same elapsed time. Thus, it is preferable to evaluate a state of the battery based on the voltage and the temperature of the battery.

In the present embodiment, as seen in FIG. 4, the electrical-loading state ST2 includes a voltage and a temperature of the first electric power source PS1. Specifically, the electrical-loading state ST2 includes a change in a voltage of the first electric power source PS1. The electrical-loading-state detector 66 includes a voltmeter 66A configured to measure the voltage of the first electric power source PS1. The electrical-loading-state detector 66 includes a thermometer 66B configured to measure the temperature of the first electric power source PS1. For example, the thermometer 66B is configured to measure an environmental temperature of the first electric power source PS1. The electrical-loading-state detector 66 is electrically connected to the controller 26A. The voltmeter 66A and the thermometer 66B are electrically connected to the controller 26A. The controller 26A is configured to receive the voltage measured by the voltmeter 66A of the electrical-loading-state detector 66. The controller 26A is configured to receive the temperature measured by the thermometer 66B of the electrical-loading-state detector 66.

The controller 26A is configured to store the electrical-loading state ST2 detected by the electrical-loading-state detector 66 in the memory 26M. In the present embodiment, the controller 26A is configured to store the voltage measured by the voltmeter 66A in the memory 26M. The controller 26A is configured to store the temperature measured by the thermometer 66B in the memory 26M. The controller 26A is configured to periodically store the voltage measured by the voltmeter 66A in the memory 26M. The power supply controller 26 is configured to periodically store the temperature measured by the thermometer 66B in the memory 26M.

The controller 26A is configured to compare the electrical-loading state ST2 currently detected by the electrical-loading-state detector 66 and the electrical-loading state ST2 previously detected by the electrical-loading-state detector 66. The controller 26A is configured to compare the voltage currently measured by the voltmeter 66A and the voltage previously measured by the voltmeter 66A to obtain the change in the voltage of the first electric power source PS1.

In a case where the second electric power source PS2 is connected to the connection port 34 in the second mode, the power supply controller 26 is configured to control the power supplying state based on comparison between the electrical-loading state ST2 detected by the electrical-loading-state detector 66 and the predetermined electrical-loading state. In the present embodiment, the controller 26A is configured to calculate a voltage-value difference which is a difference between the voltage currently measured by the voltmeter 66A and the voltage previously measured by the voltmeter 66A. The predetermined electrical-loading state includes a predetermined voltage-value difference. The controller 26A is configured to compare the voltage-value difference with the predetermined electrical-loading state. A smaller voltage-value difference indicates that the first electric power source PS1 is in a normal status. A larger voltage-value difference indicates that the first electric power source PS1 is in an abnormal status. Thus, the power supply controller 26 is configured to allow supply of electric power from the first electric power source PS1 to the first communicator CM1 if the voltage-value difference is smaller than the predetermined voltage-value difference. The power supply controller 26 is configured to interrupt electric power supplied from the first electric power source PS1 if the voltage-value difference is equal to or larger than the predetermined voltage-value difference.

The power supply controller 26 is configured to change the predetermined electrical-loading state based on the electrical-loading state ST2 detected by the electrical-loading-state detector 66. The predetermined electrical-loading state includes a plurality of predetermined voltage-value differences respectively corresponding to a plurality of temperature ranges. If the current temperature measured by the thermometer 66B is in one of the plurality of temperature ranges, the controller 26A is configured to select one of the plurality of predetermined voltage-value differences corresponding to the one of the plurality of temperature ranges. The controller 26A is configured to compare the voltage-value difference with the selected one of the plurality of predetermined voltage-value differences.

The power supply controller 26 is configured to allow supply of electric power from the first electric power source PS1 to the first communicator CM1 if the voltage-value difference is smaller than the selected one of the plurality of predetermined voltage-value differences. The power supply controller 26 is configured to interrupt electric power supplied from the first electric power source PS1 if the voltage-value difference is equal to or larger than the selected one of the plurality of predetermined voltage-value differences. Thus, it is possible to determine whether the first electric power source PS1 is in a normal status based on the voltage and the temperature measured by the detector 28. In a case where the second electric power source PS2 is connected to the connection port 34 in the second mode, the power supply controller 26 is configured to use the first electric power source PS1 if the first electric power source PS1 is in a normal status while the power supply controller 26 is configured to stop using the first electric power source PS1.

As seen in FIGS. 4 to 8, the power supply controller 26 is configured to control the power supplying state in accordance with the communication state detected by the detector 28. The power supply controller 26 is configured to control the power supplying state in accordance with the communication state detected by the communication-state detector 32.

As seen in FIG. 5, the communication state includes a first communication state ST31 where the first communicator CM1 establishes the wired communication with the second communicator CM2. The detector 28 is configured to detect the first communication state ST31. The communication-state detector 32 is configured to detect the first communication state ST31. The communication-state detector 32 is configured to detect that the first wired communicator WD1 is selected by the power supply controller 26 among the first wireless communicator WC1 and the first wired communicator WD1.

As seen in FIG. 7, the communication state includes a second communication state ST32 where the first communicator CM1 establishes the wireless communication with the second communicator CM2. The detector 28 is configured to detect the second communication state ST32. The communication-state detector 32 is configured to detect the second communication state ST32. The communication-state detector 32 is configured to detect that the first wireless communicator WC1 is selected by the power supply controller 26 among the first wireless communicator WC1 and the first wired communicator WD1.

As seen in FIG. 6, in the third mode, the power supply controller 26 is configured to control electric power supplied from the first electric power source PS1 to the first communicator CM1 to have a first amount AM31 in accordance to the first communication state ST31 detected by the detector 28. In the third mode, the power supply controller 26 is configured to control electric power supplied from the second electric power source PS2 to the first communicator CM1 to have a second amount AM32 in accordance with the first communication state ST31 detected by the detector 28.

In the present embodiment, the first amount AM31 is zero. The second amount AM32 is larger than the first amount AM31. The second amount AM32 is larger than zero. However, the first amount AM31 can be larger than zero if needed and/or desired. The second amount AM32 can be equal to or smaller than the first amount AM31 if needed and/or desired. The second amount AM32 can be zero if needed and/or desired.

The power supply controller 26 is configured to control electric power supplied from the second electric power source PS2 to the first communicator CM1 to have the second amount AM32 if the communication-state detector 32 detects the first communication state ST31. The second voltage controller 42 is configured to convert the second input voltage V21 supplied from the second electric power source PS2 to the second amount AM32 if the second electric power source PS2 is connected to the connection port 34 of the control device 25. Namely, the second amount AM32 corresponds to the second predetermined voltage V22 which is the output voltage of the second voltage controller 42. The second amount AM32 in the third mode is equal to the second amount AM12 in the first mode.

The power supply controller 26 is configured to control electric power supplied from the first electric power source PS1 to the first communicator CM1 to have the first amount AM31 if the communication-state detector 32 detects the first communication state ST31. Specifically, the controller 26A is configured to stop supplying the second gate voltage VG2 to the second FET 50 of the third voltage controller 47 if the communication-state detector 32 detects the first communication state ST31. The second FET 50 is configured to stop supplying the first gate voltage VG1 to the first FET 48 of the third voltage controller 47 in response to the stop of the second gate voltage VG2. The first FET 48 is configured to interrupt the flow of current from the first electric power source PS1 to the first voltage controller 40 in response to the stop of the first gate voltage VG1. Thus, the power supply controller 26 is configured to stop supply of electric power from the first electric power source PS1 to the first communicator CM1 if the first communicator CM1 establishes the wired communication with the second communicator CM2. The first amount AM31 in the third mode is equal to the first amount AM11 in the first mode.

In the present embodiment, the first amount AM31 is a voltage of the electric power supplied from the first electric power source PS1 to the first communicator CM1. The second amount AM32 is a voltage of the electric power supplied from the second electric power source PS2 to the first communicator CM1. However, at least one of the first amount AM31 and the second amount AM32 can be other physical amount such as a current or electric energy.

As seen in FIG. 8, in the third mode, the power supply controller 26 is configured to control electric power supplied from the first electric power source PS1 to the first communicator CM1 to have a first amount AM33 in accordance with the second communication state ST32 detected by the detector 28. In the third mode, the power supply controller 26 is configured to control electric power supplied from the second electric power source PS2 to the first communicator CM1 to have a second amount AM34 in accordance with the second communication state ST32 detected by the detector 28.

In the present embodiment, the second amount AM34 is zero. The first amount AM33 is larger than the second amount AM34. The first amount AM33 is larger than zero. However, the first amount AM33 can be equal to or smaller than the second amount AM34 if needed and/or desired. The second amount AM34 can be larger than zero if needed and/or desired. The first amount AM33 can be zero if needed and/or desired.

The power supply controller 26 is configured to control electric power supplied from the first electric power source PS1 to the first communicator CM1 to have the first amount AM33 which is larger than zero if the communication-state detector 32 detects the second communication state ST32. Specifically, the controller 26A is configured to keep supplying the second gate voltage VG2 to the second FET 50 of the third voltage controller 47 if the communication-state detector 32 detects the second communication state ST32. The second FET 50 is configured to keep supplying the first gate voltage VG1 to the first FET 48 of the third voltage controller 47 in response to stop of the second gate voltage VG2. The first FET 48 is configured to allow the flow of current from the first electric power source PS1 to the first voltage controller 40 while the first gate voltage VG1 is supplied to the first gate terminal G1 of the first FET 48. Thus, the power supply controller 26 is configured to allow supply of electric power from the first electric power source PS1 to the first communicator CM1 if the first communicator CM1 establishes the wireless communication with the second communicator CM2. The first amount AM33 in the third mode is equal to the first amount AM13 in the first mode.

In the second communication state ST32, electric power is not supplied from the second electric power source PS2 to the first communicator CM1 since the second electric power source PS2 is not connected to the connection port 34. Thus, the second amount AM34 is zero.

In the present embodiment, the first amount AM33 is a voltage of the electric power supplied from the first electric power source PS1 to the first communicator CM1. The second amount AM34 is a voltage of the electric power supplied from the second electric power source PS2 to the first communicator CM1. However, at least one of the first amount AM33 and the second amount AM34 can be other physical amount such as a current or electric energy.

As seen in FIG. 2, the control device 25 further comprises an informing unit 68. The informing unit 68 is configured to inform the at least one of the power-source state and the communication state. The power supply controller 26 is configured to control the informing unit 68 to inform the user of the power-source state detected by the power-supplying-state detector 30 of the detector 28. The power supply controller 26 is configured to control the informing unit 68 to inform the user of the communication state detected by the communication-state detector 32 of the detector 28.

The power supply controller 26 is configured to control the informing unit 68 to indicate the first connection state ST11 if the power-supplying-state detector 30 detects the first connection state ST11. The power supply controller 26 is configured to control the informing unit 68 to indicate the second connection state ST12 if the power-supplying-state detector 30 detects the second connection state ST12. The power supply controller 26 is configured to control the informing unit 68 to indicate the first communication state ST31 if the communication-state detector 32 detects the first communication state ST31. The power supply controller 26 is configured to control the informing unit 68 to indicate the second communication state ST32 if the communication-state detector 32 detects the second communication state ST32. The power supply controller 26 is configured to control the informing unit 68 to indicate that the remaining level of the first electric power source PS1 is sufficient to properly operate the power supply controller 26 and the first communicator CM1 if the voltage measured by the voltmeter 66A is equal to or higher than a voltage threshold. The power supply controller 26 is configured to control the informing unit 68 to indicate that the remaining level of the first electric power source PS1 is not sufficient to properly operate the power supply controller 26 and the first communicator CM1 if the voltage measured by the voltmeter 66A is lower than a voltage threshold.

The informing unit 68 includes a light emitter such as a light emitting diode (LED). The informing unit 68 is electrically connected to the controller 26A. The informing unit 68 is electrically connected to the processor 26P and the memory 26M through the circuit board 26C and the system bus 26D. The informing unit 68 is configured to emit light to indicate the first connection state ST11, the second connection state ST12, the first communication state ST31, and the second communication state ST32 in a different manner such as a plurality of different colors and a lighting control (e.g., lighting and blinking) The informing unit 68 can be omitted from the control device 25.

Figure 10:
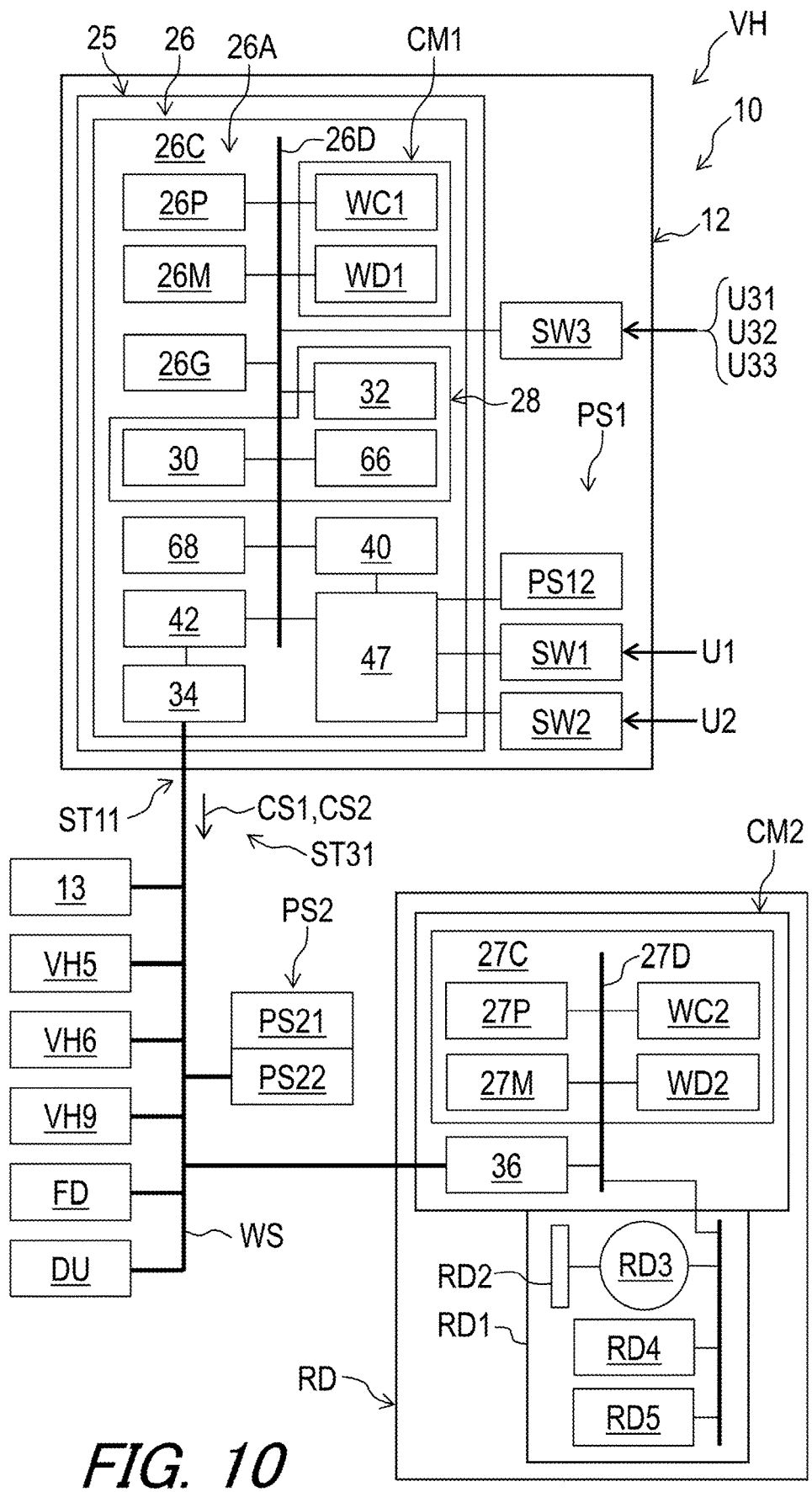
FIG. 10 is a schematic diagram of the human-powered vehicle illustrated in FIG. 1 (first connection state in first or second mode, first communication state in third mode).
Figure 11:
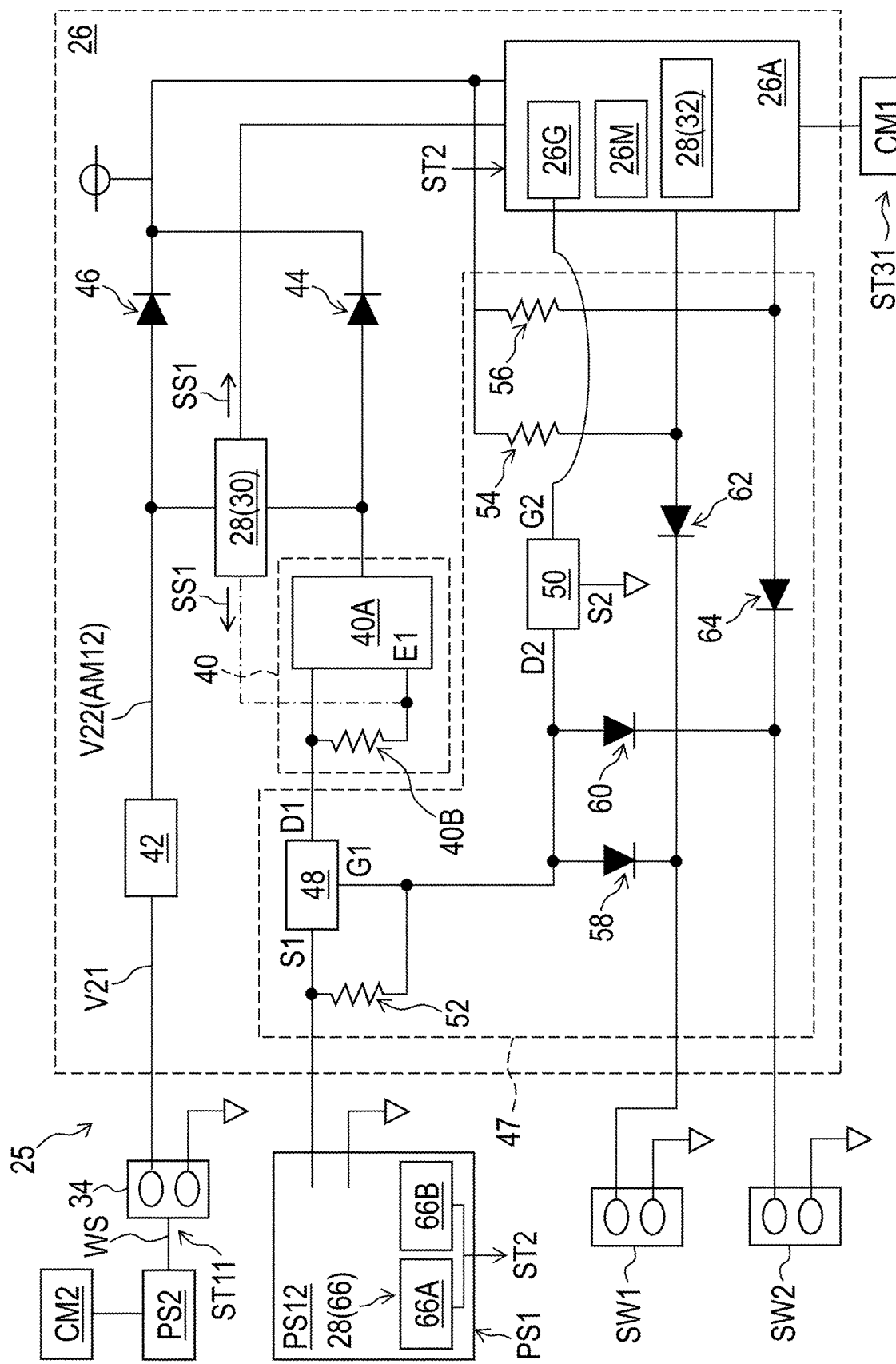
FIG. 11 is a schematic diagram of the control system of the human-powered vehicle illustrated in FIG. 1 (first connection state in first or second mode, first communication state in third mode).

As seen in FIGS. 10 and 11, in each of the first mode, the second mode, and the third mode, electric power is not supplied from the first electric power source PS1 to the power supply controller 26 if the first electric power source PS1 is not connected to the power supply controller 26. For example, electric power is not supplied from the first electric power source PS1 to the power supply controller 26 if the first battery PS11 is not attached to the first battery holder PS12. Thus, in each of the first mode, the second mode, and the third mode, the power supply controller 26 is configured to allow electric power supplied from the second electric power source PS2 to the first communicator CM1 if the second electric power source PS2 is connected to the connection port 34 but the first electric power source PS1 is not connected to the power supply controller 26. The first wired communicator WD1 of the first communicator CM1 is configured to establish the weird communication with the second wired communicator WD2 of the second communicator CM2.

The control of the control device 25 will be described in detail below referring to FIGS. 12 to 15.

Figure 12:
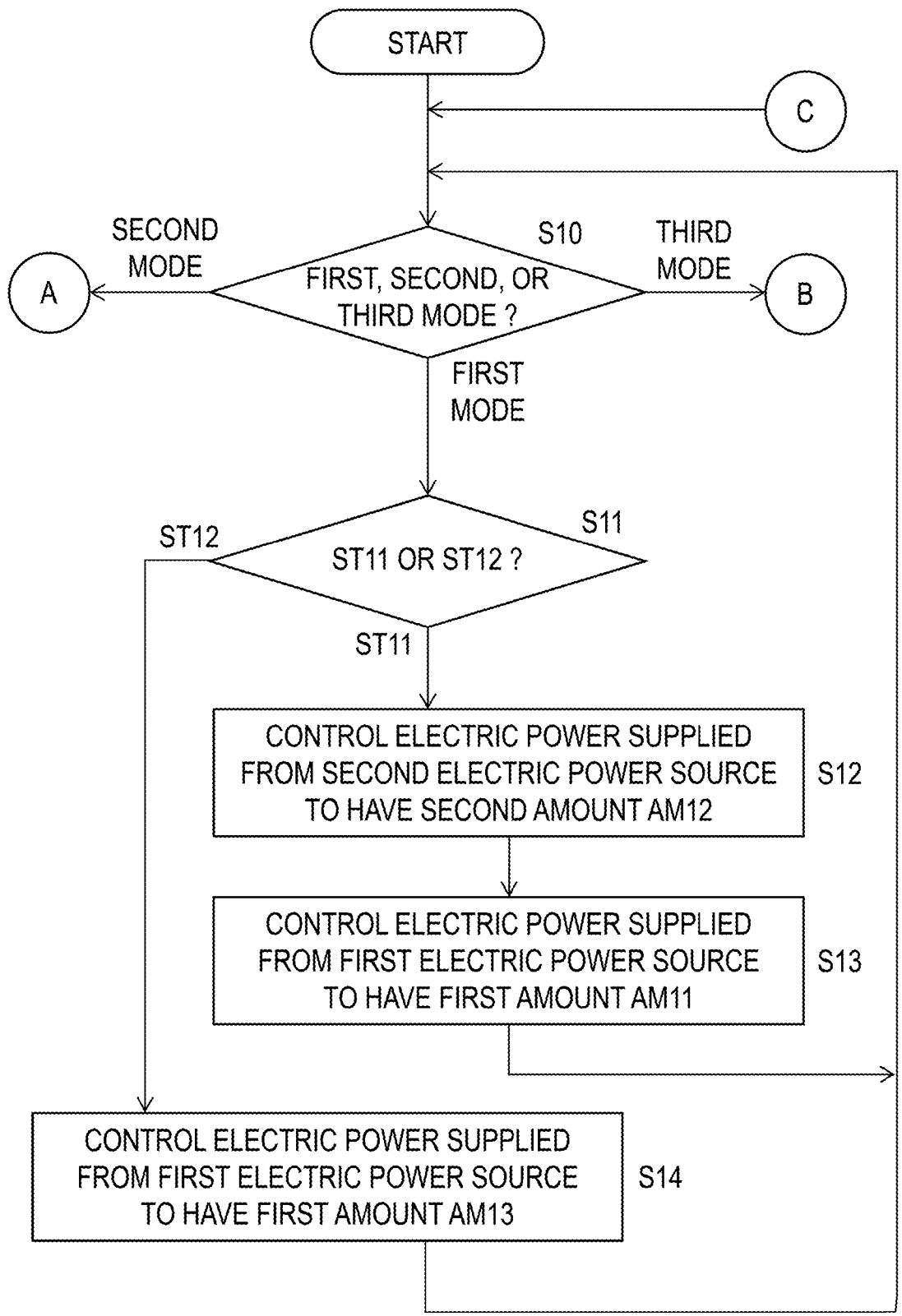
FIG. 12 is a flowchart of the control of the control system of the human-powered vehicle illustrated in FIG. 1 (first mode).

As seen in FIG. 12, the power supply controller 26 determines that the power supply controller 26 is in the first mode, the second mode, or the third mode (step S10). The power supply controller 26 determines that the detector 28 detects the first connection state ST11 or the second connection state ST12 if the power supply controller 26 determines that the power supply controller 26 is in the first mode (step S11). Specifically, as seen in FIG. 6, the power-supplying-state detector 30 outputs the first state signal SS1 if the second electric power source SP2 is connected to the connection port 34 of the control device 25 in the first mode. The power-supplying-state detector 30 outputs the second state signal SS2 if the second electric power source SP2 is not connected to the connection port 34 of the control device 25 in the first mode.

As seen in FIG. 12, the power supply controller 26 controls electric power supplied from the second electric power source PS2 to the first communicator CM1 to have the second amount AM12 which is larger than zero if the power-supplying-state detector 30 detects the first connection state ST11 in the first mode (step S12). Specifically, as seen in FIG. 6, the second voltage controller 42 converts the second input voltage V21 supplied from the second electric power source PS2 to the second amount AM12 (e.g., the second predetermined voltage V22) if the second electric power source PS2 is connected to the connection port 34 of the control device 25 in the first mode.

As seen in FIG. 12, the power supply controller 26 controls electric power supplied from the first electric power source PS1 to the first communicator CM1 to have the first amount AM11 which is zero if the power-supplying-state detector 30 detects the first connection state ST11 in the first mode (step S13). Specifically, as seen in FIG. 6, the controller 26A stops supplying the second gate voltage VG2 to the second FET 50 of the third voltage controller 47 if the controller 26A receives the first state signal SS1 from the power-supplying-state detector 30 in the first mode. The second FET 50 stops supplying the first gate voltage VG1 to the first FET 48 of the third voltage controller 47 in response to stop of the second gate voltage VG2. The first FET 48 interrupts the flow of current from the first electric power source PS1 to the first voltage controller 40 in response to stop of the first gate voltage VG1. Thus, the power supply controller 26 stops supply of electric power from the first electric power source PS1 to the first communicator CM1 if the second electric power source PS2 is connected to the connection port 34 of the control device 25 in the first mode.

Accordingly, if the second electric power source PS2 is connected to the connection port 34 in the first mode, electric power is supplied from the second electric power source PS2 to the first communicator CM1 through the power supply controller 26 while the power supply controller 26 interrupts supply of electric power from the first electric power source PS1 to the first communicator CM1. Thus, the first communicator CM1 is powered by the second electric power source PS2 without using the first electric power source PS1 if the second electric power source PS2 is connected to the connection port 34 in the first mode.

As seen in FIG. 12, the power supply controller 26 controls electric power supplied from the first electric power source PS1 to the first communicator CM1 to have the first amount AM13 which is larger than zero if the power-supplying-state detector 30 detects the second connection state ST12 in the first mode (step S14). Specifically, as seen in FIG. 8, the controller 26A keeps supplying the second gate voltage VG2 to the second FET 50 of the third voltage controller 47 if the controller 26A receives the second state signal SS2 from the power-supplying-state detector 30 in the first mode. The second FET 50 keeps supplying the first gate voltage VG1 to the first FET 48 of the third voltage controller 47 in response to stop of the second gate voltage VG2. The first FET 48 allows the flow of current from the first electric power source PS1 to the first voltage controller 40 while the first gate voltage VG1 is supplied to the first gate terminal G1 of the first FET 48. Thus, the power supply controller 26 allows supply of electric power from the first electric power source PS1 to the first communicator CM1 if the second electric power source PS2 is not connected to the connection port 34 of the control device 25 in the first mode.

Accordingly, if the second electric power source PS2 is not connected to the connection port 34 in the first mode, electric power is supplied from the first electric power source PS1 to the first communicator CM1 through the power supply controller 26 while electric power is not supplied from the second electric power source PS2 to the first communicator CM1. Thus, the first communicator CM1 is powered by the first electric power source PS1 without using the second electric power source PS2 if the second electric power source PS2 is not connected to the connection port 34 in the first mode.

Figure 13:
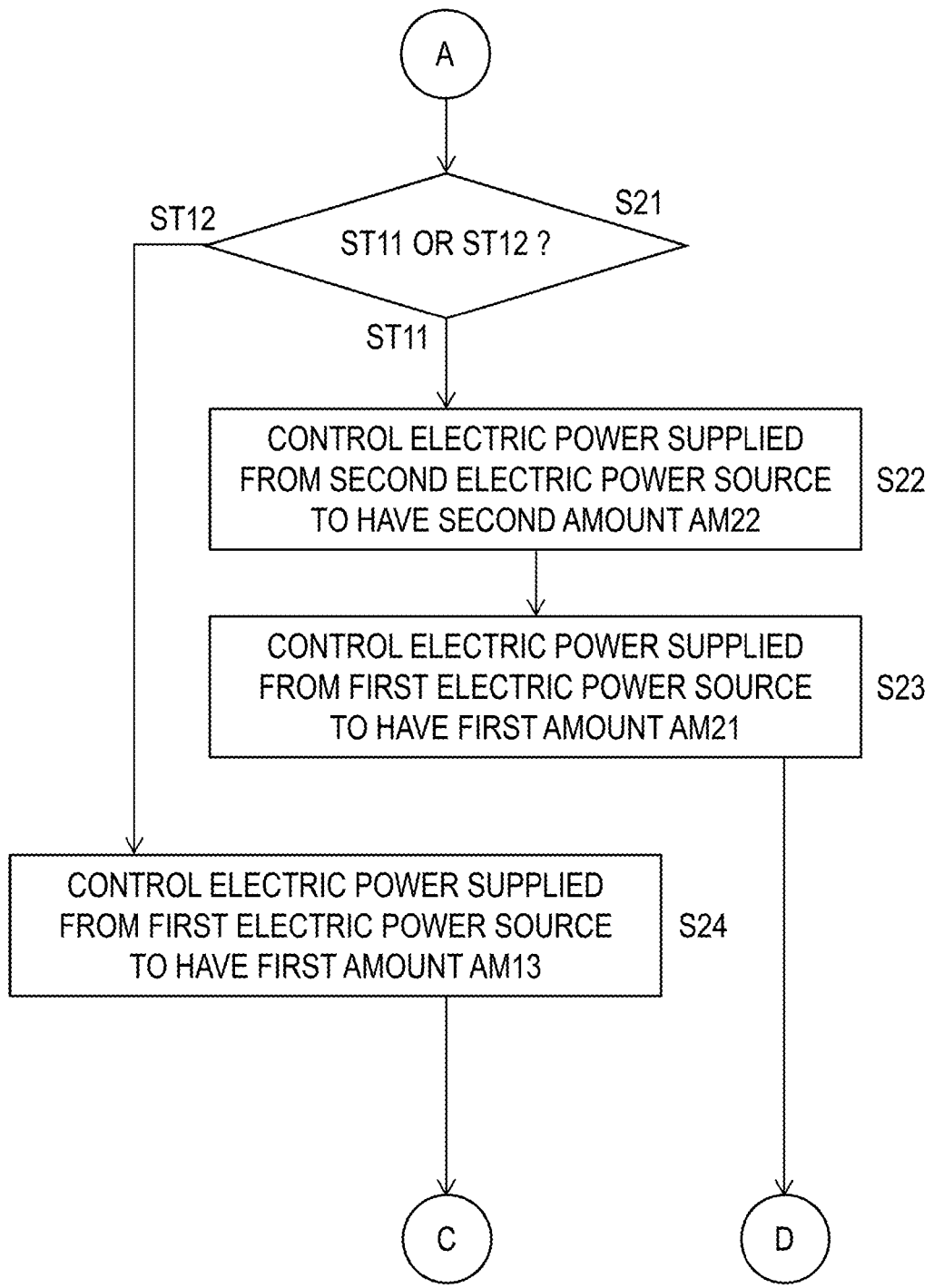
FIGS. 13 and 14 are flowcharts of the control of the control system of the human-powered vehicle illustrated in FIG. 1 (second mode).

As seen in FIG. 13, as with the step S11 of FIG. 12, the power supply controller 26 determines that the detector 28 detects the first connection state ST11 or the second connection state ST12 if the power supply controller 26 determines that the power supply controller 26 is in the second mode (step S21).

As with the step S12 of FIG. 12, the power supply controller 26 controls electric power supplied from the second electric power source PS2 to the first communicator CM1 to have the second amount AM22 which is larger than zero if the power-supplying-state detector 30 detects the first connection state ST11 in the second mode (step S22). Specifically, as seen in FIG. 11, the second voltage controller 42 converts the second input voltage V21 supplied from the second electric power source PS2 to the second amount AM22 (e.g., the second predetermined voltage V22) if the second electric power source PS2 is connected to the connection port 34 of the control device 25 in the second mode.

As seen in FIG. 13, the power supply controller 26 controls electric power supplied from the first electric power source PS1 to the first communicator CM1 to have the first amount AM21 which is larger than zero if the power-supplying-state detector 30 detects the first connection state ST11 in the second mode (step S23). Specifically, as seen in FIG. 11, the controller 26A keeps supplying the second gate voltage VG2 to the second FET 50 of the third voltage controller 47 if the controller 26A receives the first state signal SS1 from the power-supplying-state detector 30 in the second mode. The second FET 50 keeps supplying the first gate voltage VG1 to the first FET 48 of the third voltage controller 47 in response to the second gate voltage VG2. The first FET 48 allows the flow of current from the first electric power source PS1 to the first voltage controller 40 in response to the first gate voltage Vol. Thus, the power supply controller 26 allows supply of electric power from the first electric power source PS1 to the first communicator CM1 if the second electric power source PS2 is connected to the connection port 34 of the control device 25.

Accordingly, if the second electric power source PS2 is connected to the connection port 34 in the second mode, electric power is supplied from the second electric power source PS2 to the first communicator CM1 through the power supply controller 26 while electric power is supplied from the first electric power source PS1 to the first communicator CM1 through the power supply controller 26. Thus, unlike the first mode, the first communicator CM1 is powered by both the first electric power source PS1 and the second electric power source PS2 if the second electric power source PS2 is connected to the connection port 34 in the second mode.

As seen in FIG. 13, as with the step S14 of FIG. 12, the power supply controller 26 controls electric power supplied from the first electric power source PS1 to the first communicator CM1 to have the first amount AM13 which is larger than zero if the power-supplying-state detector 30 detects the second connection state ST12 in the second mode (step S24). Accordingly, if the second electric power source PS2 is not connected to the connection port 34 in the second mode, electric power is supplied from the first electric power source PS1 to the first communicator CM1 through the power supply controller 26 while electric power is not supplied from the second electric power source PS2 to the first communicator CM1. Thus, as with the first mode, the first communicator CM1 is powered by the first electric power source PS1 without using the second electric power source PS2 if the second electric power source PS2 is not connected to the connection port 34 in the second mode.

Figure 14:
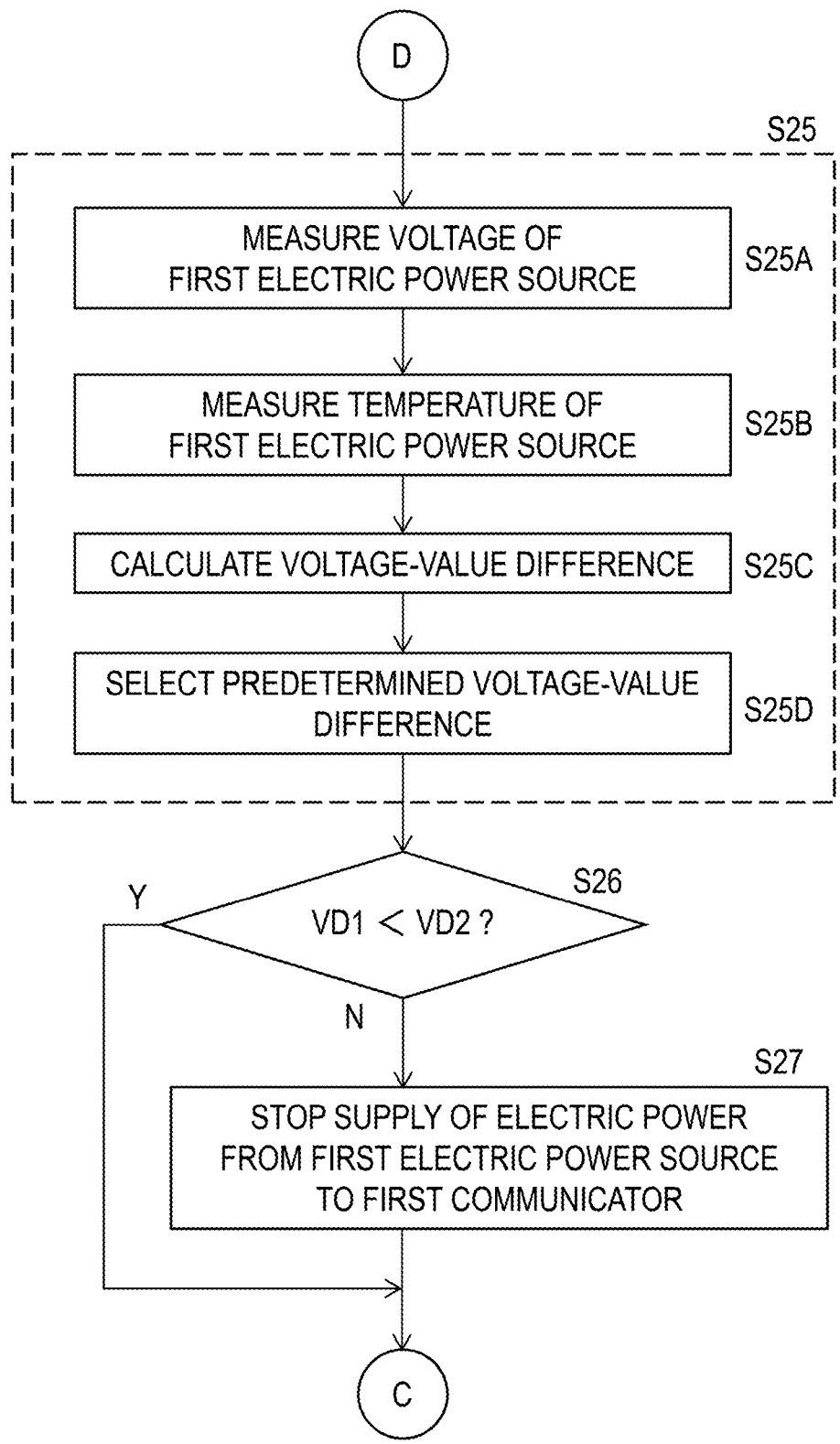

As seen in FIG. 14, the electrical-loading-state detector 66 detects the electrical-loading state ST2 after the step S23 of FIG. 13 in the second mode (step S25). Specifically, the voltmeter 66A measures the voltage of the first electric power source PS1 (step S25A). The thermometer 66B measures the temperature of the first electric power source PS1 (step S25B). The controller 26A of the power supply controller 26 calculates a voltage-value difference VD1 which is a difference between the previous voltage and the current voltage (step S25C). The controller 26A selects the predetermined voltage-value difference VD2 from among the plurality of predetermined voltage-value differences based on the current temperature measured by the thermometer 66B in the second mode (step S25D). The step S25 can include at least one of the steps S25A, S25B, S25C, and S25D. The step S25 can include another step in addition to the at least one of the steps S25A, S25B, S25C, and S25D if needed and/or desired.

The controller 26A compares the voltage-value difference VD1 with the predetermined voltage-value difference VD2 in the second mode (step S26). The controller 26A keeps allowing electric power to be supplied from the first electric power source PS1 to the first communicator CM1 if the voltage-value difference VD1 is smaller than the predetermined voltage-value difference VD2 in the second mode (step S26). The controller 26A stops supply of electric power from the first electric power source PS1 to the first communicator CM1 if the voltage-value difference VD1 is equal to or larger than the predetermined voltage-value difference VD2 in the second mode (steps S26 and S27). Thus, the power supply controller 26 uses both the first electric power source PS1 and the second electric power source PS2 in the second mode if the first electric power source PS1 is in a normal status and the second electric power source PS2 is connected to the connection port 34. The power supply controller 26 uses the second electric power source PS2 but does not use the first electric power source PS1 in the second mode if the first electric power source PS1 is in an abnormal status and the second electric power source PS2 is connected to the connection port 34.

Figure 15:
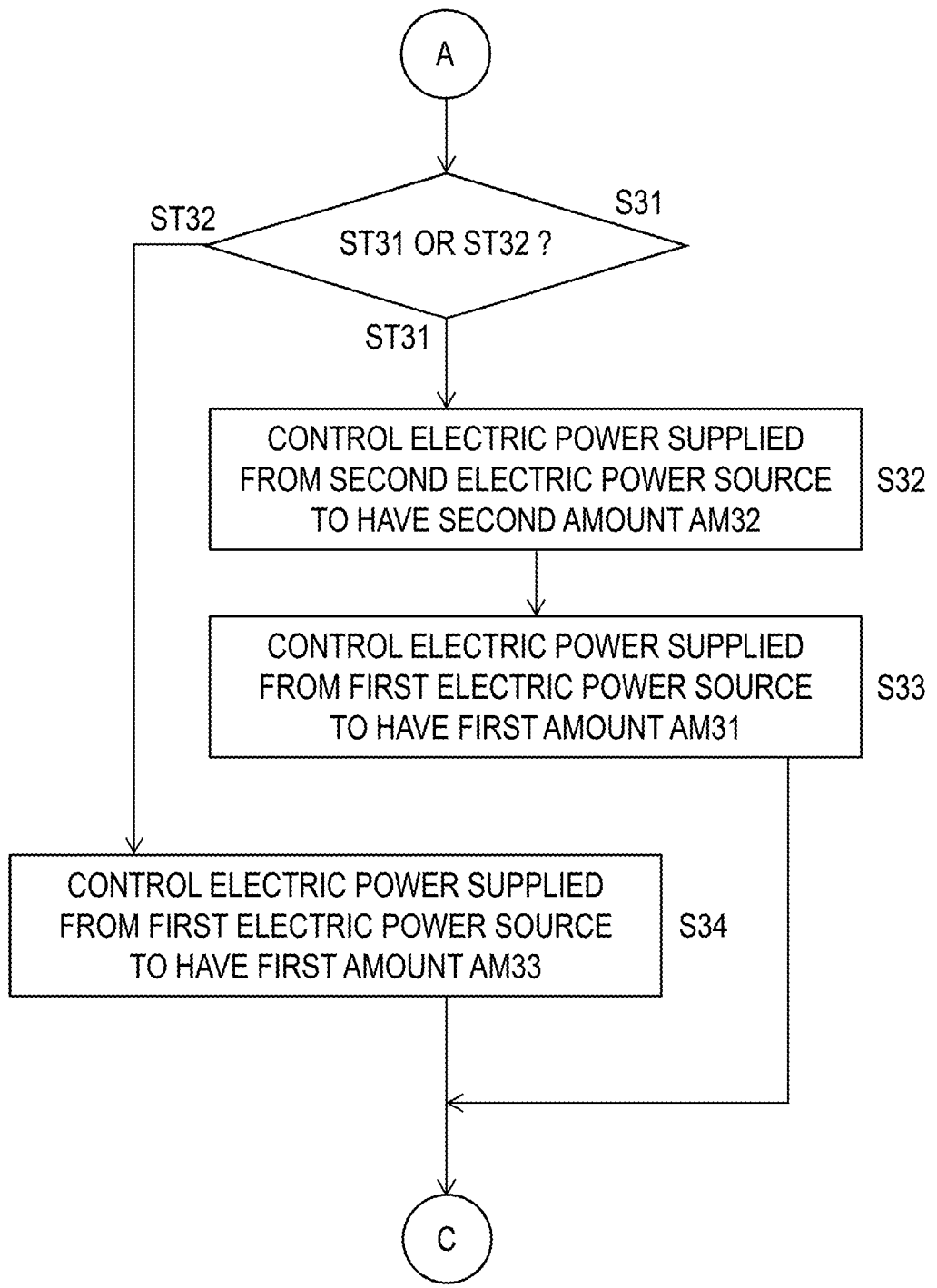
FIG. 15 is a flowchart of the control of the control system of the human-powered vehicle illustrated in FIG. 1 (third mode).

As seen in FIG. 15, the power supply controller 26 determines that the detector 28 detects the first communication state ST31 or the second communication state ST32 if the power supply controller 26 determines that the power supply controller 26 is in the third mode (step S31). Specifically, the communication-state detector 32 detects the first communication state ST31 or the second communication state ST32.

The power supply controller 26 controls electric power supplied from the second electric power source PS2 to the first communicator CM1 to have the second amount AM32 which is larger than zero if the communication-state detector 32 detects the first communication state ST31 in the third mode (step S32). Specifically, as seen in FIG. 6, the second voltage controller 42 converts the second input voltage V21 supplied from the second electric power source PS2 to the second amount AM32 (e.g., the second predetermined voltage V22) if the wired communication is established between the first communicator CM1 and the second communicator CM2 in the third mode.

As seen in FIG. 15, the power supply controller 26 controls electric power supplied from the first electric power source PS1 to the first communicator CM1 to have the first amount AM31 which is zero if the communication-state detector 32 detects the first communication state ST31 in the third mode (step S33). Specifically, as seen in FIG. 6, the controller 26A stops supplying the second gate voltage VG2 to the second FET 50 of the third voltage controller 47 if the controller 26A concludes that the communication-state detector 32 detects the first communication state ST31 in the third mode. The second FET 50 stops supplying the first gate voltage VG1 to the first FET 48 of the third voltage controller 47 in response to stop of the second gate voltage VG2. The first FET 48 interrupts the flow of current from the first electric power source PS1 to the first voltage controller 40 in response to stop of the first gate voltage VG1. Thus, the power supply controller 26 stops supply of electric power from the first electric power source PS1 to the first communicator CM1 if the wired communication is established between the first communicator CM1 and the second communicator CM2 in the third mode.

Accordingly, if the second electric power source PS2 is connected to the connection port 34 in the third mode, electric power is supplied from the second electric power source PS2 to the first communicator CM1 through the power supply controller 26 while the power supply controller 26 interrupts supply of electric power from the first electric power source PS1 to the first communicator CM1. Thus, the first communicator CM1 is powered by the second electric power source PS2 without using the first electric power source PS1 in the third mode.

As seen in FIG. 15, as with the step S14 of FIG. 12, the power supply controller 26 controls electric power supplied from the first electric power source PS1 to the first communicator CM1 to have the first amount AM33 which is larger than zero if the communication-state detector 32 detects the second communication state ST32 in the third mode (step S34).

Accordingly, if the wireless communication is established between the first communicator CM1 and the second communicator CM2 in the third mode, electric power is supplied from the first electric power source PS1 to the first communicator CM1 through the power supply controller 26 while electric power is not supplied from the second electric power source PS2 to the first communicator CM1. Thus, the first communicator CM1 is powered by the first electric power source PS1 without using the second electric power source PS2 if the wireless communication is established between the first communicator CM1 and the second communicator CM2 in the third mode.

Modifications

In the above embodiment, one or two modes of the first to third modes can be omitted from the mode of the power supply controller 26. For example, the first communicator CM1 and the second communicator CM2 are configured to establish the wired communication using the PLC in the above embodiment. However, the first communicator CM1 and the second communicator CM2 can be configured to communicate with each other using only the wireless communication. In such a modification, the third mode can be omitted from the mode of the power supply controller 26.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a first communicator of a human-powered vehicle configured to establish one of a wireless communication and a wired communication with a second communicator, the control device comprising:
   a power supply controller configured to control a power supplying state of at least one of a first electric power source and a second electric power source to supply electric power to the first communicator based on at least one of
      a power-source state of at least one of the first electric power source and the second electric power source, and
      a communication state between the first communicator and the second communicator,
   the second electric power source being positioned away from the control device.

2. The control device according to claim 1, further comprising
   a detector configured to detect the at least one of the power-source state and the communication state.

3. The control device according to claim 2, wherein
   the detector is configured to detect the power-source state, and
   the power supply controller is configured to control the power supplying state in accordance with the power-source state detected by the detector.

4. The control device according to claim 3, wherein
   the power-source state includes a first connection state where the second electric power source is connected to a connection port,
   the power supply controller is configured to control electric power supplied from the first electric power source to the first communicator to have a first amount in accordance with the first connection state detected by the detector,
   the power supply controller is configured to control electric power supplied from the second electric power source to the first communicator to have a second amount in accordance with the first connection state detected by the detector, and
   the second amount is larger than the first amount.

5. The control device according to claim 4, wherein
   the first amount is zero.

6. The control device according to claim 3, wherein
   the power-source state includes a second connection state where the second electric power source is not connected to the connection port,
   the power supply controller is configured to control electric power supplied from the first electric power source to the first communicator to have a first amount in accordance with the second connection state detected by the detector, and
   the first amount is larger than zero.

7. The control device according to claim 3, wherein
   the power-source state includes an electrical-loading state of the first electric power source, and
   the power supply controller is configured to control the power supplying state based on comparison between the electrical-loading state detected by the detector and a predetermined electrical-loading state.

8. The control device according to claim 7, wherein
   the electrical-loading state relates to at least one of a voltage, a current, resistance, a temperature, a power threshold, and a priority level of the first electric power source.

9. The control device according to claim 1, further comprising
   an informing unit configured to inform the at least one of the power-source state and the communication state.

10. The control device according to claim 1, wherein
    the power supply controller includes
       a first voltage controller configured to convert a first input voltage supplied from the first electric power source, and
       a second voltage controller configured to convert a second input voltage supplied from the second electric power source.

11. The control device according to claim 10, wherein
    the first voltage controller is configured to increase the first input voltage to a first predetermined voltage, and
    the second voltage controller is configured to regulate the second input voltage to a second predetermined voltage.

12. An operating device for a human-powered vehicle, comprising:
the control device according to claim 1;
a base member; and
a movable member pivotally coupled to the base member about a pivot axis.

13. The operating device according to claim 12, wherein the base member extends in a longitudinal direction and includes
a first end portion configured to be coupled to a handlebar,
a second end portion opposite to the first end portion in the longitudinal direction, and
a grip portion provided between the first end portion and the second end portion.

14. A control system for a human-powered vehicle, comprising:
the control device according to claim 1; and
the second communicator.

15. The control system according to claim 14, wherein
the second communicator is coupled to at least one component of the human-powered vehicle, and
the at least one component includes one of a gear changing device, a suspension, an adjustable seatpost assembly, a brake device, a display device, and a drive assist unit.

16. A control device for a first communicator of a human-powered vehicle configured to establish one of a wireless communication and a wired communication with a second communicator, the control device comprising:
a power supply controller configured to control a power supplying state of at least one of a first electric power source and a second electric power source to supply electric power to the first communicator based on at least one of
a power-source state of at least one of the first electric power source and the second electric power source, and
a communication state between the first communicator and the second communicator; and
a detector configured to detect the at least one of the power-source state and the communication state,
the detector is configured to detect the communication state, and
the power supply controller is configured to control the electric power supplying state in accordance with the communication state detected by the detector.

17. The control device according to claim 16, wherein
the communication state includes a first communication state where the first communicator establishes a wired communication with the second communicator,
the power supply controller is configured to control electric power supplied from the first electric power source to the first communicator to have a first amount in accordance with the first communication state detected by the detector,
the power supply controller is configured to control electric power supplied from the second electric power source to the first communicator to have a second amount in accordance with the first communication state detected by the detector, and
the second amount is larger than the first amount.

18. The control device according to claim 17, wherein the first amount is zero.

19. The control device according to claim 16, wherein
the communication state includes a second communication state where the first communicator establishes a wireless communication with the second communicator,
the power supply controller is configured to control electric power supplied from the first electric power source to the first communicator to have a first amount in accordance with the second communication state detected by the detector,
the power supply controller is configured to control electric power supplied from the second electric power source to the first communicator to have a second amount in accordance with the second communication state detected by the detector, and
the first amount is larger than the second amount.

20. The control device according to claim 19, wherein the second amount is zero.

21. A control device for a first communicator of a human-powered vehicle configured to establish one of a wireless communication and a wired communication with a second communicator, the control device comprising:
a power supply controller configured to control a power supplying state of at least one of a first electric power source and a second electric power source to supply electric power to the first communicator based on a power-source state, the power-source state including a connection state between the control device and the second electric power source,
the second electric power source being positioned away from the control device.

22. A control device for a first communicator of a human-powered vehicle configured to establish one of a wireless communication and a wired communication with a second communicator, the control device comprising:
a power supply controller configured to control a power supplying state of at least one of a first electric power source and a second electric power source to supply electric power to the first communicator based on a power-source state of at least one of the first electric power source and the second electric power source,
the second electric power source is positioned away from the control device.

* * * * *